US012027009B2

(12) United States Patent
Boese

(10) Patent No.: US 12,027,009 B2
(45) Date of Patent: Jul. 2, 2024

(54) GAMING MACHINE WITH COLUMN SPECIFIC AWARDS

(71) Applicant: Aristocrat Technologies, Inc. (ATI), Las Vegas, NV (US)

(72) Inventor: Eric Boese, Decatur, GA (US)

(73) Assignee: ARISTOCRAT TECHNOLOGIES, INC. (ATI), Las Vegas, NV (US)

( * ) Notice: Subject to any disclaimer, the term of this patent is extended or adjusted under 35 U.S.C. 154(b) by 0 days.

(21) Appl. No.: 18/307,432

(22) Filed: Apr. 26, 2023

(65) Prior Publication Data

US 2023/0267800 A1 Aug. 24, 2023

Related U.S. Application Data

(63) Continuation of application No. 17/669,964, filed on Feb. 11, 2022, now Pat. No. 11,651,645, which is a continuation of application No. 16/555,684, filed on Aug. 29, 2019, now Pat. No. 11,263,862.

(51) Int. Cl.

| | |
|---|---|
| ***G07F 17/34*** | (2006.01) |
| ***G07F 17/32*** | (2006.01) |

(52) U.S. Cl.

CPC ...... *G07F 17/3213* (2013.01); *G07F 17/3244* (2013.01); *G07F 17/34* (2013.01)

(58) Field of Classification Search

CPC ... G07F 17/34; G07F 17/3213; G07F 17/3244

See application file for complete search history.

(56) References Cited

U.S. PATENT DOCUMENTS

| | | | |
|---|---|---|---|
| 7,070,501 | B2 | 7/2006 | Cormack |
| 8,360,851 | B2 | 1/2013 | Aoki |
| 9,424,720 | B2 | 8/2016 | Suda |
| 9,928,691 | B2 | 3/2018 | Olive |
| 2003/0216165 | A1 | 11/2003 | Singer |
| 2004/0043812 | A1 | 3/2004 | Ellis |

(Continued)

FOREIGN PATENT DOCUMENTS

| | | | |
|---|---|---|---|
| AU | 2013202658 | | 1/2014 |
| AU | 2013251288 | A1 | 5/2014 |

(Continued)

OTHER PUBLICATIONS

Office Action dated Jun. 10, 2021 for U.S. Appl. No. 16/555,684 (pp. 1-11).

(Continued)

*Primary Examiner* — David L Lewis
*Assistant Examiner* — Shauna-Kay Hall
(74) *Attorney, Agent, or Firm* — McAndrews, Held & Malloy, Ltd.

(57) ABSTRACT

During play of a feature game, a gaming machine holds each feature trigger symbol at its respective display position, and if a group of symbol display positions has spins remaining, spins/respins reels of the respective group to obtain replacement symbols for each non-feature trigger symbol in the group. For each of group of symbol display positions, the gaming machine determines, based on the symbols in the groups, whether to award a prize identified by a prize tab associated with the group. Aspects of the feature game may be implemented in a base or primary game.

20 Claims, 11 Drawing Sheets

(56) References Cited

U.S. PATENT DOCUMENTS

2004/0137982 A1 7/2004 Cuddy
2006/0189369 A1 8/2006 Taylor
2007/0060248 A1 3/2007 Rodgers
2007/0129135 A1 6/2007 Marks
2008/0234032 A1 9/2008 Brunet de Courssou
2009/0054129 A1 2/2009 Yoshimura
2009/0239634 A1 9/2009 Nguyen
2010/0029369 A1* 2/2010 Pacey ................. G07F 17/3211 463/43
2010/0075737 A1 3/2010 Bluemel
2010/0124968 A1 5/2010 Hoffman
2010/0210343 A1 8/2010 Englman
2010/0234092 A1 9/2010 Gomez
2011/0124400 A1 5/2011 Scholtz
2012/0178517 A1 7/2012 Montenegro
2013/0331168 A1 12/2013 Street
2014/0087820 A1* 3/2014 Brune ................. G07F 17/3262 463/20
2014/0274292 A1 9/2014 Suda
2014/0323198 A1 10/2014 Tuck
2015/0310699 A1 10/2015 Meyer
2016/0035191 A1 2/2016 Cuddy
2016/0042597 A1 2/2016 Olive
2016/0253873 A1 9/2016 Olive
2017/0148274 A1 5/2017 Olive
2017/0154498 A1 6/2017 Olive
2018/0268655 A1 9/2018 Olive
2018/0276941 A1* 9/2018 Meyer ................. G07F 17/3267
2019/0073860 A1 3/2019 Reynolds
2019/0073862 A1* 3/2019 Bryant ................ G07F 17/3213
2020/0357240 A1 11/2020 Tam

FOREIGN PATENT DOCUMENTS

AU 2014202042 A1 5/2014
EP 0984408 3/2000

OTHER PUBLICATIONS

Office Action (Notice of Allowance and Fees Due (PTOL-85) dated Nov. 1, 2021 for U.S. Appl. No. 16/555,684 (pp. 1-8).
Australian Examination Report for AU2016100230, dated May 11, 2016, 5 pages.
Australian Examination Report for AU2015210489, dated Jun. 14, 2016, 5 pages.
Australian Examination Report for AU2016202727, dated Jul. 4, 2016, 5 pages.
Australian Examination Report for AU2017101629, dated Jan. 16, 2018, 3 pages.
Australian Examination Report for AU2017204560, dated Feb. 1, 2018, 3 pages.
U.S. Appl. No. 16/455,166, filed Jun. 27, 2019, System and Method for Providing a Feature Game.
Australian Examination Report for AU2017101097, dated Dec. 7, 2017. (3 pages).
Office Action (Notice of Allowance and Fees Due (PTOL-85)) dated Feb. 24, 2023 for U.S. Appl. No. 17/669,964 (pp. 1-10).

* cited by examiner

400

| Stop # | Reel 1 (410A) | Reel 2 (410B) | Reel 3 (410C) | Reel 4 (410D) | Reel 5 (410E) |
|---|---|---|---|---|---|
| 19 | | | C | | |
| 18 | | | C | | |
| 17 | | | B | | |
| 16 | A | | A | | |
| 15 | D | | G | | |
| 14 | E | A | F | | |
| 13 | F | C | D | | D |
| 12 | C | B | E | | B (430) |
| 11 | D | A | C | D | C |
| 10 | B | E | D | D | A |
| 9 | C | D | A | C | B |
| 8 | A | C | B | B | D |
| 7 | B | A | B | D | E |
| 6 | A | B | C | C | F |
| 5 | A | A | B | D | A |
| 4 | B | B | C | A | B |
| 3 | A | C | C | B | D |
| 2 | C | A | A | E | E |
| 1 | B | B | C | E | C |
| 0 | B | B | A | D | E |

FIG. 4

GAMING MACHINE WITH COLUMN SPECIFIC AWARDS

RELATED APPLICATIONS

This application is a continuation of U.S. patent application Ser. No. 17/669,964, filed Feb. 11, 2022, which is a continuation of U.S. patent application Ser. No. 16/555,684, filed Aug. 29, 2019, the contents of the above-identified applications are hereby incorporated herein by reference in their entirety.

BACKGROUND

Gaming machines provide a variety of wagering games such as slot games, video poker games, video blackjack games, roulette games, video bingo games, keno games and other types of games that are frequently offered at casinos and other locations. Playing a primary or base game, hereafter base game, of a gaming machine typically involves a player establishing a credit balance by inputting money or another form of monetary credit, and placing a monetary wager funded by the credit balance on one or more outcomes of an instance or single play of the base game. For many base games, a player may qualify for secondary games, sometimes referred to as bonus games, feature games, or bonus rounds, by attaining a certain winning combination or triggering event in the base game. Secondary games provide an opportunity to win additional game instances, credits, awards, jackpots, progressives, etc. Awards from winning outcomes are typically added back to the credit balance and may be provided to the player upon completion of a gaming session or when the player wants to "cash out."

"Slot" type games are often displayed to the player in the form of various symbols arrayed in a row-by-column grid or matrix. Specific matching combinations of symbols along predetermined paths or paylines through the matrix indicate the outcome of the game. The gaming machine typically highlights winning combinations/outcomes for ready identification by the player. Matching combinations and their corresponding awards are usually shown in a "pay-table" which is available to the player for reference. Often, the player may vary their wager by varying a number of active paylines and/or an amount bet on each active payline. By varying the wager, the player may alter the frequency or number of winning combinations, frequency or number of secondary games, and/or the amount awarded.

Typical gaming machines use a random number generator (RNG) to randomly determine the outcome of each game. The game machine is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the gaming machine, per one or more random numbers generated by the RNG, randomly determines a game outcome and selects symbols which correspond to that outcome. Notably, some gaming machines provide games that may include an element of skill on the part of the player and are therefore not entirely random.

SUMMARY

Aspects of the present disclosure are directed to a gaming machine and a method of playing a game of such a gaming machine. The gaming machine permits a player to play a base game. During play of the base game, the gaming machine selects symbols for a base game outcome and displays the selected symbols of the base game outcome in columns. The gaming machine further award prizes based on the symbols in the base game outcome. If the base game outcome includes at least a threshold number of a feature trigger symbol, the gaming machine triggers or initiates play of a feature game, and awards a quantity of spins to each feature game column of symbol display positions.

During play of the feature game, the gaming machine holds each feature trigger symbol at its respective display position, and if a column has spins remaining, spins/respins reels of the respective feature game column to obtain replacement symbols for each non-feature trigger symbol in the feature game column. For each of the feature game columns, the gaming machine determines, based on the symbols in the feature game column, whether to award a prize associated with the respective feature game column.

Advantages, aspects and novel features of the present disclosure, as well as details of an illustrated embodiment thereof, will be more fully understood from the following description and drawings.

BRIEF DESCRIPTION OF THE DRAWINGS

FIG. 4 depicts exemplary reel strips suitable for selecting base game symbols and/or feature game symbols.

DETAILED DESCRIPTION

Figure 1:
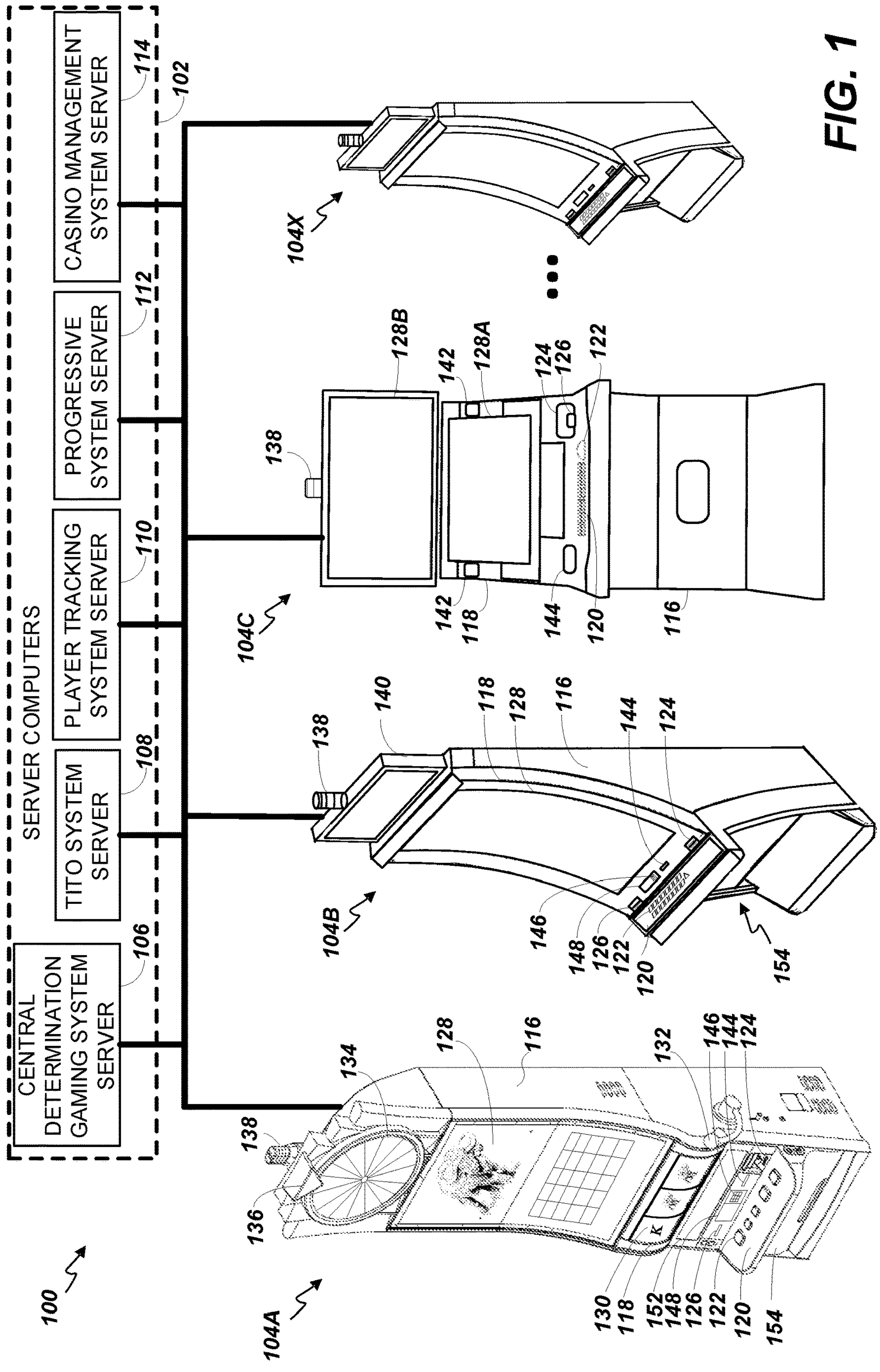
FIG. 1 is an exemplary diagram showing several gaming machines networked with various gaming related servers.

Aspects of the present disclosure are directed to a gaming machine and a method of playing a game of such a gaming machine. During play of a base game, if the base game outcome includes at least a threshold number of a feature trigger symbol, the gaming machine triggers or initiates play of a feature game, and awards a quantity of spins to each feature game column of symbol display positions. During play of the feature game, the gaming machine holds each feature trigger symbol at its respective display position, and if a column has spins remaining, spins/respins reels of the respective feature game column to obtain replacement symbols for each non-feature trigger symbol in the feature game column. For each of the feature game columns, the gaming machine determines, based on the symbols in the feature game column, whether to award a prize associated with the respective feature game column.

Embodiments of the present disclosure represent an improvement in the art of electronic gaming machines and software for such electronic gaming machines. For example, at least some embodiments of the present disclosure provide a visual correlation between a jackpot and a game result that resulted in an award of the jackpot. In such embodiments, a jackpot amount may be displayed above or near a column of symbols so as to correlate the jackpot amount with the column. Subsequently, awarding the jackpot amount due to trigger symbols in the column provides an easily perceived and understood visual correlation to the player that the jackpot award was due to the trigger symbols in the column.

Thus, embodiments of the present disclosure are not merely new game rules or simply new display patterns, but provide technologic improvements in the art of electronic gaming machines and software for such electronic gaming machines. Moreover, the above example is not intended to be limiting but merely exemplary of technologic improvements provided by some embodiments of the present disclosure. Technological improvements of other embodiments are readily apparent to those of ordinary skill in the art in light of the present disclosure.

According to various embodiments of the present disclosure, a gaming machine includes a display device, a memory device, and a processor that executes instructions stored in the memory device. Execution of the instructions causes the processor to at least award a first quantity of spins to a first column of symbol display positions of the display device. Execution of the instructions further causes the processor to, in response to the first quantity of spins indicating at least one spin remains for the first column, spin one or more first reels of the first column to obtain a first column outcome comprising first symbols at respective symbol display positions in the first column. Execution of the instructions further causes the processor to, in response to the first symbols of the first column outcome corresponding to a first winning outcome for the first column, award a first prize associated with the first column.

According to further embodiments of the present disclosure, a gaming machine includes a display device, a player input device, a memory device, and a processor that executes instructions stored in the memory device. Execution of the instructions causes the processor to at least receive an input via the player input device to initiate play of a base game. For the play of the base game, execution of the instructions causes the processor to select and display symbols at symbol display positions on the display device. In particular, the processor selects the symbols from a feature trigger symbol and a plurality of non-feature trigger symbols. Execution of the instructions further causes the processor to initiate play of a feature game in response to a predetermined number of the feature trigger symbol being displayed in a base game outcome. For the play of the feature game, execution of the instructions causes the processor to hold each feature trigger symbol at a corresponding feature game symbol display position. The processor further awards a quantity of spins to each feature game column and spins one or more reels associated with each feature game column to select a replacement symbol for each feature game symbol display position that does not display the feature trigger symbol. The processor further awards a prize associated with a feature game column in response to the respective feature game column comprising at least a predetermined number of the feature trigger symbol.

According to yet other embodiments of the present disclosure, a method of a gaming machine includes initiating play of a base game in response to receiving an input via a player input device of the gaming machine. For the play of the base game, the method includes selecting and displaying symbols at symbol display positions on a display device of the gaming machine, wherein the symbols are selected from a feature trigger symbol and a plurality of non-feature trigger symbols, and initiating play of a feature game in response to a predetermined number of the feature trigger symbol being displayed in a base game outcome. For the play of the feature game, the method includes holding, in a first feature game column, each feature trigger symbol displayed in a first base game column of the base game outcome, spinning one or more of first reels associated with the first feature game column to select a first replacement symbol for each non-feature trigger symbol in the first feature game column, and awarding a first prize associated with the first feature game column in response to the first feature game column comprising at least a first predetermined number of the feature trigger symbol.

Various aspects of the present disclosure may be embodied in many different forms and should not be construed as being limited to the example embodiments set forth herein. Rather, these example embodiments of the disclosure are provided so that this disclosure will be thorough and complete and will convey various aspects of the disclosure to those skilled in the art.

As used herein, the singular forms are intended to include the plural forms as well, unless the context clearly indicates otherwise. It will be further understood that the terms "comprise," "include," "comprising," and "including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various features, steps, operations, elements, and/or components, these features, steps, operations, elements, and/or components should not be limited by these terms. These terms are only used to distinguish one feature, step, operation, element, and/or component from another. Thus, for example, a first feature, a first step, a first operation, a first element, and/or a first component discussed below could be termed a second feature, a second step, a second operation, a second element, and/or a second component without departing from the teachings of the present disclosure.

Spatially relative terms, such as "beneath," "below," "lower," "above," "upper," and the like, are used herein for ease of description to describe a relationship of an element and/or feature to another element and/or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. The device may be otherwise oriented (rotated 90 degrees or at other orientations) and the spatially relative descriptors used herein may be interpreted accordingly.

Furthermore, the term "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}.

Referring now to FIG. 1, several different models of gaming machines are illustrated, which may be networked to various gaming related servers. In particular, FIG. 1 shows a system 100 in a gaming environment that includes one or more server computers 102 (e.g., slot servers of a casino) that are in communication, via a communications network, with one or more gaming machines 104A-104X (slot machines, video poker machines, bingo machines, etc.) that may implement one or more aspects of the present disclosure. Also, aspects of the present disclosure may be implemented by a portable and/or remote gaming device such as, but not limited to, a smart phone, a tablet, a laptop, or a game console. However, such gaming devices may require specialized software and/or hardware to comply with regulatory requirements regarding devices used for wagering or games of chance in which monetary awards are provided.

Communication between and/or among the gaming machines 104A-104X and the server computers 102 may be direct or indirect, such as over the Internet through a website maintained by a computer on a remote server and/or over an online data network including commercial online service providers, Internet service providers, private networks, and the like. In other embodiments, the gaming machines 104A-104X may communicate with one another and/or the server computers 102 over radio frequency (RF) links, cable TV links, satellite links, and/or the like.

In some embodiments, server computers 102 may not be necessary and/or preferred. For example, in one or more embodiments, a stand-alone gaming machine such as gaming machine 104A, gaming machine 1048, and/or any of the other gaming machines 104C-104X may implement one or more aspects of the present disclosure. However, it is typical to find multiple gaming machines connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming machines 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming machines 104A-104X that utilize the game outcomes and display the results to the players.

The gaming machine 104A may provide a cabinet construction which may be aligned in rows or banks of similar devices for placement and operation on a casino floor. The gaming machine 104A may include a main door 154 which provides access to the interior of the cabinet. The gaming machine 104A may also include a player interface 120 that is accessible by a player of the gaming machine 104A and that is configured with input switches or buttons 122, an access channel for a bill validator 124, and/or an access channel for a ticket-out printer 126.

In FIG. 1, the gaming machine 104A is shown as a Relm XL™ model gaming machine manufactured by Aristocrat® Technologies, Inc. As shown, the gaming machine 104A is a reel machine having a gaming display area 118 comprising a number (typically 3 or 5) of mechanical reels 130 with various symbols displayed on them. The reels 130 are independently spun and stopped to show a set of symbols within the gaming display area 118, which may be used to present a game outcome comprising a plurality of symbols.

In many configurations, the gaming machine 104A may include a main display device 128 mounted to, or above, the gaming display area 118. The main display device 128 may include a high-resolution LCD display device, a plasma display device, an LED display device, or an OLED display device, a cathode ray tube (CRT) display device, and/or another video display device. Furthermore, the main display device 128 may be flat or curved as shown.

In some embodiments, the bill validator 124 may also function as a "ticket-in" reader that allows the player to use a casino issued credit ticket to load credits onto the gaming machine 104A (e.g., in a cashless ticket ("TITO") system). In such cashless embodiments, the gaming machine 104A may also include a "ticket-out" printer 126 for outputting a credit ticket when a "cash out" button of the player interface 120 is pressed. Cashless TITO systems are used to generate and track unique bar-codes and/or other indicators printed on tickets to allow players to avoid the use of bills and coins by loading credits using a ticket reader and cashing out credits using a ticket-out printer 126 on the gaming machine 104A. The gaming machine 104A may also include hardware meters to track, monitor, and/or otherwise record various game-related data. For example, the gaming machine 104A may include hardware meters that monitor a player credit balance and that records a total amount of money wagered, a total amount of money deposited, a total amount of money withdrawn, and/or a total amount of winnings for gaming machine 104A. Such hardware meters may further ensure that the gaming machine 104A maintains regulatory compliance.

In some embodiments, a player tracking card reader 144, a transceiver for wireless communication with a player's smartphone, a keypad 146, and/or an illuminated display 148 for reading, receiving, entering, and/or displaying player tracking information is provided in gaming machine 104A. In such embodiments, a game controller within the gaming machine 104A may communicate with the player tracking system server 110 to send and receive player tracking information.

The gaming machine 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of the gaming machine 104A and may be activated by a player (e.g., using a switch or one of buttons 122 of player interface 120) to indicate to operations staff that the gaming machine 104A has experienced a malfunction or that the player requires service. The candle 138 may also be used to indicate a jackpot has been won and to alert staff that a hand payout of an award may be needed.

The gaming machine 104A may also include one or more information panels 152 which may be a back-lit, silkscreened glass panel with lettering to indicate general game information. Such general game information may include, for example, game denominations (e.g., $0.25 or $1), paylines, pay-tables, and/or various game related graphics. In some embodiments, the gaming machine 104A may implement the information panel(s) 152 via additional video display devices.

The gaming machine 104A may also include a handle 132. The handle 132 may be mounted on a side of a main cabinet 116 for the gaming machine 104A. In some embodiments, a player may pull the handle 132 to initiate play of a game provided by the gaming machine 104A.

Figure 2:
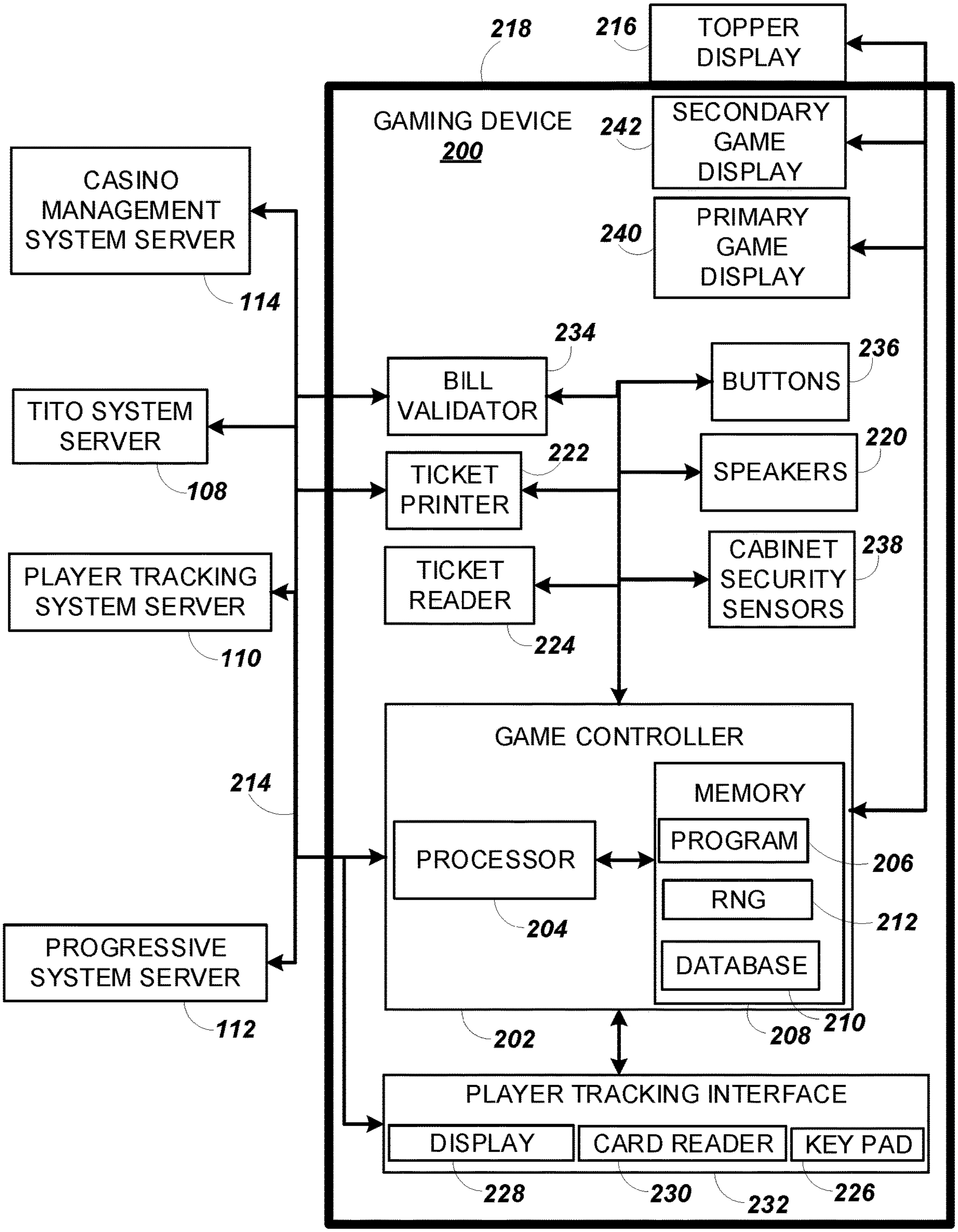
FIG. 2 is a block diagram showing various functional elements of an exemplary gaming machine.

Many or all the above described components may be controlled by circuitry (e.g., a gaming controller) housed inside the main cabinet 116 of the gaming machine 104A. Details of example circuitry are shown in FIG. 2.

Note that not all gaming machines suitable for implementing embodiments of the present disclosure necessarily include top wheels, top boxes, information panels, cashless ticket systems, and/or player tracking systems. Further, some suitable gaming machines have only a single game display that includes only a mechanical set of reels and/or a video display. Other suitable gaming machines may be designed for bar counters or table tops and have displays that face upwards.

An alternative example gaming machine 1048 illustrated in FIG. 1 is the Arc™ model gaming machine manufactured by Aristocrat® Technologies, Inc. Note that where possible, similar features of the gaming machine 104A and the gaming machine 1048 are identified using the same reference numbers. As depicted, the gaming machine 104B does not include physical reels and instead shows game play functions on main display device 128. An optional topper display device 140 may be used as a secondary game display device for bonus play, to show game features or attraction activities while a game is not in play, or any other information or media desired by the game designer or operator. In some embodiments, topper display device 140 may also or alternatively be used to display progressive jackpot prizes available to a player during play of gaming machine 104B.

The gaming machine 1048 may include a main cabinet 116 including a main door or service door 154, which opens to provide access to an interior of the gaming machine 104B. The main door 154 may be used by service personnel to refill the ticket-out printer 126 and collect bills and tickets inserted into the bill validator 124. The main door 154 may also be accessed to reset the gaming machine 104B, verify and/or upgrade software of the gaming machine 104B, and/or for general maintenance of the gaming machine 104B.

Another example gaming machine 104C shown is the Helix™ model gaming machine manufactured by Aristocrat® Technologies, Inc. The gaming machine 104C may include main display device 128A that is in a landscape orientation. Although not illustrated by the front view provided, the main display device 128A may have a curvature radius from top to bottom, or alternatively from side to side. In some embodiments, the main display device 128A may include a flat panel display. The main display device 128A may be used for base or primary game play while secondary display device 1288 may be used for secondary or feature game play, to show game features or attraction activities while the game is not in play, and/or any other information or media desired by the game designer or operator. In some embodiments, the gaming machine 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming machines 104A-104C and other similar gaming machines. Each gaming machine 104A-104C may also be operable to provide many different games. Games of the gaming machines 104A-104C may be differentiated by themes, sounds, graphics, type of game (e.g., slot game vs. card game vs. game with aspects of skill), denomination, number of paylines, maximum jackpot, progressive or non-progressive awards, bonus games, and/or class (e.g., Class 2, Class 3, etc. embodiments).

FIG. 2 provides a block diagram depicting exemplary internal electronic components of a gaming machine 200 connected to various external systems. All or parts of the example gaming machine 200 shown could be used to implement any one of the example gaming machines 104A-X depicted in FIG. 1. The gaming machine 200 includes a game controller 202 that controls play of one or more games provided by the gaming machine 200. To this end, the game controller 202 includes one or more processors 204 and memory 208 coupled to the one or more processors 204. The memory 208 may store game software or a program 206 having instructions that are executed by the one or more processors 204 to control operation of the gaming machine 200 and play of games provided by the gaming machine 200. The memory 208 may include one or more mass storage devices or media that are housed within gaming machine 200. Within the mass storage devices and/or memory 208, one or more databases 210 may be provided for use by processor 204 when executing instructions of the program 206.

The gaming machine 200 may further includes a random number generator (RNG) 212. The RNG 212 may be implemented in hardware and/or software. Moreover, the RNG 212 may generate random numbers that are used in the operation of game play to ensure that game play outcomes are random and meet regulations for a game of chance. Alternatively, a game instance (i.e. a play or round of the game) may be generated on a remote gaming machine such as a central determination gaming system server 106 (see FIG. 1). The game instance is communicated to gaming machine 200 via the network 214 and then displayed on gaming machine 200. Gaming machine 200 may execute game software, such as but not limited to video streaming software that allows the game to be displayed on gaming machine 200. When a game is stored on gaming machine 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming machine 200 may include a topper display device 216 or another form of a top box (e.g., a topper wheel, a topper display device, etc.) which sits above cabinet 218. The cabinet 218 or topper display device 216 may also house a number of other components which may be used to add features to a game being played on gaming machine 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated panel or video display device), a card reader 230 for receiving data and/or communicating information to and from media or a device such as a smart phone enabling player tracking. Ticket printer 222 may be used to print tickets for a TITO system server 108. The gaming machine 200 may further include a bill validator 234, player-input buttons 236 of a player interface, cabinet security sensors 238 to detect unauthorized opening of the cabinet 218, a primary game display device 240, and a secondary game display device 242, each coupled to and operable under the control of game controller 202.

The gaming machine 200 may be connected over network 214 to player tracking system server 110. The player tracking system server 110 may be, for example, an OASIS® system manufactured by Aristocrat® Technologies, Inc. The player tracking system server 110 may be used to track play (e.g. amount wagered, games played, time of play, and/or other quantitative or qualitative measures) for individual players so that an operator may reward players in a loyalty program. The player may use the player tracking interface 232 to access his/her account information, activate free play, and/or request various information. Player tracking and loyalty programs seek to reward players for their play and help build brand loyalty to the gaming establishment. The rewards typically correspond to the player's level of patronage (e.g., the player's playing frequency and/or total amount of game plays at a given casino). Player tracking rewards may include complimentary and/or discounted meals, meals, lodging, entertainment, and/or plays. Player tracking information may be combined with other information that is now readily obtainable by a casino management system.

The gaming machines, such as gaming machines 104A-104X, 200, are highly regulated to ensure fairness and, in many cases, gaming machines 104A-104X, 200 are operable to award monetary awards (e.g., typically dispensed in the form of a redeemable voucher). Therefore, to satisfy security and regulatory requirements in a gaming environment, hardware and software architectures are implemented in gaming machines 104A-104X, 200 that differ significantly from those of general-purpose computers. Adapting general purpose computers to function as gaming machines 200 is not simple or straightforward because of: 1) the regulatory requirements for gaming machines 200; 2) the harsh environment in which gaming machines 200 operate; 3) security requirements; 4) fault tolerance requirements; and 5) special purpose componentry used to enable functionality of a gaming machine. These differences require substantial engineering effort with respect to game design implementation, hardware components, and/or software.

When a player wishes to play the gaming machine 200, he/she may insert cash or a ticket voucher through a coin acceptor (not shown) or bill validator 234 to establish a credit balance on the gaming machine 200. The player may use the credit balance to place wagers on instances of the game and to receive credit awards based on the outcome of winning instances. The gaming machine 200 may decrease the credit balance by the amount of each wager and may increase the credit balance upon a win. Moreover, the player may add additional credits to the balance at any time. The player may also optionally insert a loyalty club card into the card reader 230. During the game, the player may view the game outcome on one or more of the primary game display devices 240 and secondary game display devices 242. The gaming machine 200 may display other game and prize information via display devices 240, 242 and/or other display devices.

For each game instance, a player may make selections, which may affect play of the game. For example, the player may vary the total amount wagered by selecting the amount bet per active payline and selecting the number of active paylines. In many games, the gaming machine 200 requests the player to initiate or select options during course of game play such as, for example, spinning a wheel to begin a bonus round, selecting various items during a feature game, etc. The player may make these selections using the player-input buttons 236, a touch screen of the primary game display device 240, and/or some other input device of a player interface that enables a player to input information into the gaming machine 200.

During certain game events, the gaming machine 200 may present visual and auditory effects that may be perceived by the player. These effects add to the excitement of a game, which makes a player more likely to enjoy the playing experience. Auditory effects include various sounds that are projected by the speakers 220. Visual effects may include flashing lights, strobing lights, and/or other patterns displayed from lights on the gaming machine 200, from lights behind the information panel 152 (FIG. 1), and/or from lights separate from the gaming machine 200 which are provided in the area surrounding the gaming machine 200.

When the player is done, the player may cash out the credit balance by, for example, pressing a cash out button of the player interface to receive a ticket from the ticket printer 222. The ticket may be "cashed-in" for money or inserted into another machine to establish a credit balance for play.

In some embodiments, the gaming machine 200 may implement a slot-type or reel-type base game, play of which may trigger a slot-type or reel-type feature game as shown in FIGS. 3A-3G. In the interest of clarity, the following describes base game and feature game of FIGS. 3A-3G as implemented by gaming machine 200. Each of gaming machines 104A-104X, however, may implement the base game and/or feature of FIGS. 3A-3G via a similar manner.

Figure 3A:
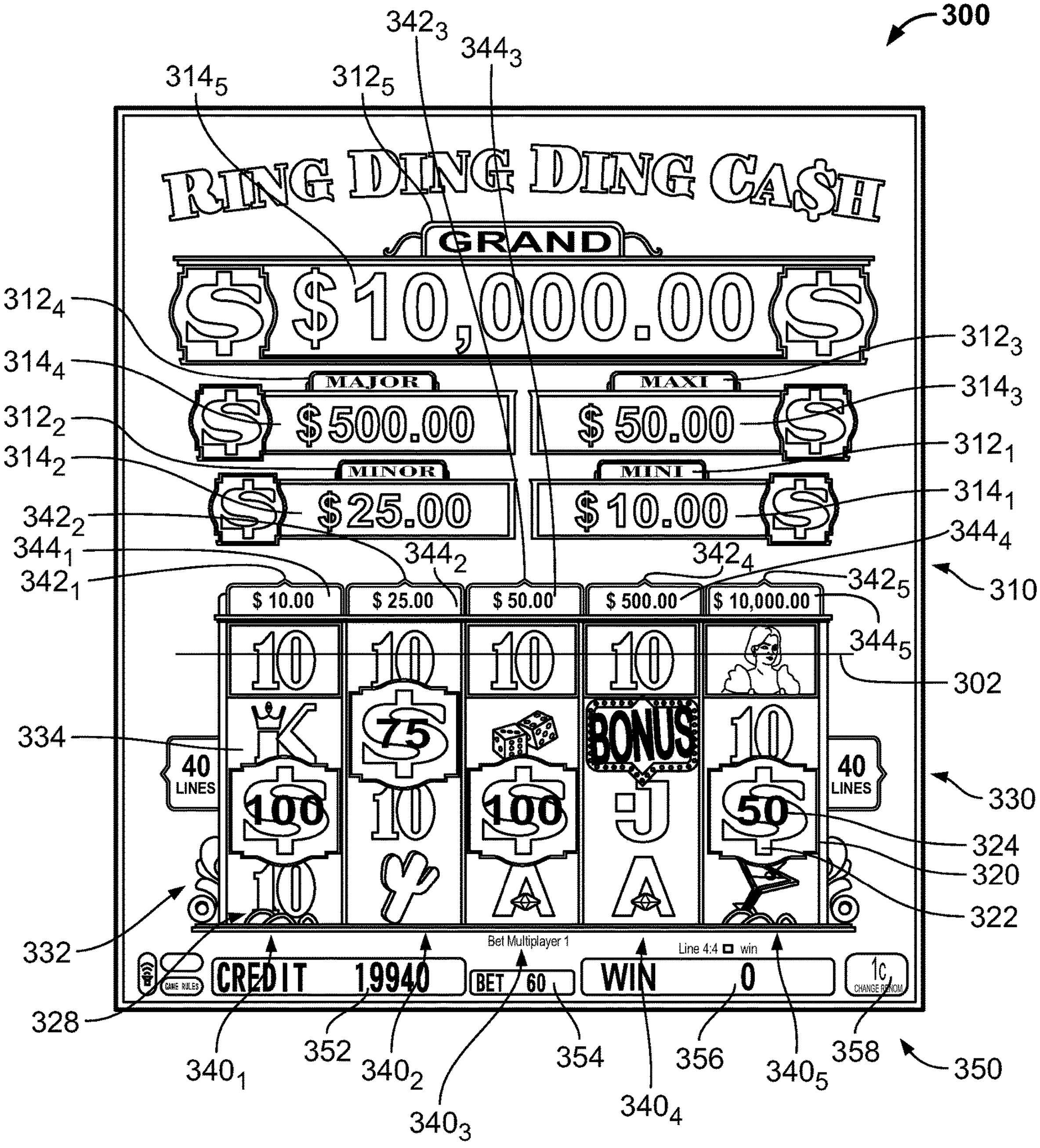
FIGS. 3A-3G depict base game screens and feature game screens for an example play flow.

As shown in FIG. 3A, the gaming machine 200 may generate and present a base game screen 300 via display device 240. The base game screen 300 may include a prize display area 310 that identifies one or more prize indicia $\mathbf{312_1}$-$\mathbf{312_5}$ and the current prize value $\mathbf{314_1}$-$\mathbf{314_5}$ of prizes associated with such indicia. For example, as shown in FIG. 3A, the prize display area 310 may display a mini prize indicia $\mathbf{312_1}$ and mini prize value $\mathbf{314_1}$, a minor prize indicia $\mathbf{312_2}$ and minor prize value $\mathbf{314_2}$, a maxi prize indicia $\mathbf{312_3}$ and maxi prize value $\mathbf{314_3}$, a major prize indicia $\mathbf{312_4}$ and major prize value $\mathbf{314_4}$, and a grand prize indicia $\mathbf{312_5}$ and grand prize value $\mathbf{314_5}$.

In some embodiments, one or all of the mini prize value $\mathbf{314_1}$, the minor prize value $\mathbf{314_2}$, the maxi prize value $\mathbf{314_3}$, the major prize value $\mathbf{314_4}$, and the grand prize value $\mathbf{314_5}$ may be implemented as progressive jackpots, as fixed bonus amounts that do not increment, or as a mixture of both. In one embodiment, the grand prize value $\mathbf{314_5}$ is implemented as a linked progressive jackpot, while the major prize value $\mathbf{314_4}$ is implemented as a standalone progressive (SAP) jackpot which only takes contributions from the gaming machine itself, incrementing the jackpot as a function of an amount of coin-in or wagers. In the same embodiment, the mini prize value $\mathbf{314_1}$ and the minor prize value $\mathbf{314_2}$ are implemented as fixed bonus amounts that are based on the initial bet wagered and increase as the wager amount increases. In some embodiments, the grand prize value $\mathbf{314_5}$ may also be implemented as a standalone progressive jackpot, or the major prize value $\mathbf{314_4}$ may be implemented as a linked progressive jackpot.

The base game screen 300 may further include a base game outcome area 330 via which the gaming machine 200 may present a base game outcome 332. To this end, the base game outcome area 330 may include one or more base game symbol display positions 334 via which base game symbols of the base game outcome 332 are presented. In particular, the base game symbol display positions 334 may be arranged in base game columns $\mathbf{340_1}$-$\mathbf{340_5}$, resulting in the base game symbols of the base game outcome 332 being presented in the base game columns $\mathbf{340_1}$-$\mathbf{340_5}$. The base game symbols of the base game outcome 332 may include instances of a feature trigger symbol 320 and one or more instances of a non-feature trigger symbols 328.

The base game outcome area 330 may further associate each base game column $\mathbf{340_1}$-$\mathbf{340_5}$ with a particular prize presented in the prize display area 310. More specifically, the base game outcome area 330 may include a base game prize tab $\mathbf{342_1}$-$\mathbf{342_5}$ for each base game column $\mathbf{340_1}$-$\mathbf{340_5}$. Each base game prize tab $\mathbf{342_1}$-$\mathbf{342_5}$ may identify which of the prizes in the prize display area 310 is associated with its respective base game column $\mathbf{340_1}$-$\mathbf{340_5}$. In one embodiment, the base game prize tab $\mathbf{342_1}$-$\mathbf{342_5}$ may present such association by including the same prize indicia $344_1$-$344_2$ (e.g., prize values and/or prize names) as the associated prize in the prize display area. For example, the base game prize tab $342_1$ may associate the first base game column $340_1$ with the mini prize by presenting a prize indicia $344_1$ of $10.00 that is the same as the mini prize value $314_1$ associated with the mini prize indicia $312_1$.

In other embodiments, the base game prize tabs $342_1$-$342_5$ may further convey such prize associations via other ways such as by including corresponding prize indicia, icon, etc. For example, the base game prize tabs $342_1$-$342_5$ may further convey the prize associations via coordinating colors. In particular, the prize display area 310 may present each prize indicia $312_1$-$312_5$ and its prize value $314_1$-$314_5$ in a different color. The base game prize tabs $342_1$-$342_5$ may likewise display their prize indicia $344_1$-$344_5$ via matching colors. For example, the mini prize indicia $312_1$ and its prize value $314_1$ may be presented via a purple color and the base game prize tab $342_1$ may likewise present the prize indicia $344_1$ via the same purple color. Conversely, the grand prize indicia $312_5$ and its prize value $314_5$ may be presented via a red color and the base game prize tab $342_5$ may likewise present the prize indicia $344_5$ via the same red color. Thus, the gaming machine 200 may further identify which prizes are associated with which columns via coordinating colors.

The base game screen 300 may further include a status area 350 that provides various status information. For example, the status area 350 may provide a credit balance meter 352 that reflects the credit balance established on the gaming machine 200, an amount bet indicator 354 that reflects an amount bet on a play of the base game, a base game win meter 356 that reflects credits won from play of the base game, and a monetary denomination indicator 358 that reflects the monetary denomination associated with each credit.

Besides the base game screen 300, the gaming machine 200 may generate and present a feature game screen 360 via display device 240. See, e.g., FIG. 3C. Similar to the base game screen 300, the feature game screen 360 may include a prize display area 362 that identifies one or more prize indicia $312_1$-$312_5$ and the current prize value $314_1$-$314_5$ associated with such indicia. For example, as shown in FIG. 3C, the prize display area 362 may display the mini prize indicia $312_1$ and the mini prize value $314_1$, the minor prize indicia $312_2$ and the minor prize value $314_2$, the maxi prize indicia $312_3$ and the maxi prize value $314_3$, the major prize indicia $312_4$ and the major prize value $314_4$, and the grand prize indicia $312_5$ and the grand prize value $314_5$.

The feature game screen 360 may further include a feature game outcome area 370 via which the gaming machine 200 may present a feature game outcome 372. To this end, the feature game outcome area 370 may include one or more feature game symbol display positions 374 via which feature game symbols of the feature game outcome 372 are presented. In particular, the feature game symbol display positions 374 may be arranged in feature game columns $380_1$-$380_5$, resulting in the feature game symbols of the feature game outcome 372 being presented in the feature game columns $380_1$-$380_5$. The feature game symbols of the feature game outcome 372 may include instances of the feature trigger symbol 320 and one or more instances of the non-feature trigger symbols 320.

The feature game outcome area 370 may further associate each feature game column $380_1$-$380_5$ with a particular prize presented in the prize display area 362. More specifically, the feature game outcome area 370 may include a feature game prize tab $392_1$-$392_5$ for each feature game column $380_1$-$380_5$. Each feature game prize tab $392_1$-$392_5$ may identify which of the prizes in the prize display area 362 is associated with its respective feature game column $380_1$-$380_5$. In one embodiment, the feature game prize tabs $392_1$-$392_5$ may present such association via prize indicia $394_1$-$394_5$ and/or colors in a manner similar to the base game prize tabs $342_1$-$342_5$. However, the feature game prize tabs $392_1$-$392_5$ further include spin indicia $396_1$-$396_5$ that identify a quantity of spins awarded to its respect feature game column $380_1$-$380_5$. In one embodiment, the gaming machine 200 visually expands or morphs the base game prize tabs $342_1$-$342_5$ into the feature game prize tabs $392_1$-$392_5$ such that the resulting feature game prize tabs $392_1$-$392_5$ include the information of base game prize tabs $342_1$-$342_5$ as well as the spin indicia $396_1$-$396_5$.

Like the base game screen 300, the feature game screen 360 may further include the status area 350. Via such status area, the feature game screen 360 may indicate the credit balance meter 352, the amount bet indicator 354, the base game win meter 356, and the monetary denomination indicator 358. In addition to the status area 350, the feature game screen 360 may further include a feature game win meter 359 via which the gaming machine 200 may indicate an amount won during play of the feature game.

The base game screen 300 and feature game screen 360 are depicted in FIGS. 3A-3G as having the same number of columns and the same arrangement of symbol display positions. However, the base game screen 300 and the feature game screen 360 in some embodiments may be implemented such that the base game and feature game do not have the same number of columns and/or the same arrangement of symbol display positions. In some embodiments, the height of the columns may vary from the base game and feature game. For example, the height of the columns (and the quantity of symbol display positions in each column) may be greater in the feature game than in the base game.

As noted above, the gaming machine 200 generates and displays the base game outcome 332 and the feature game outcome 372. To this end, the gaming machine 200 may spin reels associated with the base game columns $340_1$-$340_5$, feature game columns $380_1$-$380_5$, base game symbol display positions 334, and/or feature game symbols display positions 374. In at least one embodiment, each base game column $340_1$-$340_5$ has its own symbol-carrying reel that supplies its column of base game symbol display positions 334 with base game symbols. Furthermore, each feature game symbol display position 374 has its own symbol-carrying reel that supplies its feature game symbol display position 374 with a feature game symbol.

In such an embodiment, as shown in FIG. 3A, the base game symbols of the base game screen 300 may be provided via five symbol-carrying reels that each provide symbols for the four (4) base game symbol display positions 334 in its respective column, whereas the feature game symbols of the feature game screen 360 may be provided via twenty (20) symbol-carrying reels. In various embodiments, the number of reels per column may range between a single reel per column to up to a separate reel per symbol display position. Thus, for the 4×5 base game outcome 332 of FIG. 3A, between five (5) and twenty reels may be used to provide the base game symbols. Likewise, for the 4×5 feature game outcome 372 of FIG. 3C, between five (5) and twenty (20) reels may be used to provide the feature game symbols in various embodiments. Furthermore, while base outcome 332 and a feature game outcome 372 are depicted as providing 4×5 arrays of symbol display positions, embodiments may provide base game outcomes and/or feature game outcomes having a different arrangement (e.g., 3×3, 3×5, 5×5, etc.) of symbol display positions. Moreover, the feature game outcome may have a different arrangement of symbols than the base game outcome.

Turning now to FIG. 4, details are presented regarding reel strips 410A-410E that the gaming machine 200 may use to generate the base game outcome 332 and/or feature game outcome 372. As shown, each reel strip 410A-410E provides an ordered set of game symbols 430. In the depicted embodiment, the predetermined symbol set consists of seven different game symbols 430, which are represented by different letters (e.g. A, B, C, D, E, F, G) for ease of illustration. However, other embodiments may utilize a predetermined symbol set consisting of a different number of game symbols 430. Moreover, the game symbols 430 may take on other shapes that may align with a particular theme of the gaming machine 200. See, e.g., symbols of FIGS. 3A-3G.

As further shown, each reel strip 410A-410E may include an ordered symbol set consisting of a fixed number of game symbols 430 that are arranged in a predefined order. In some embodiments, each reel strip 410A-410E may include the same fixed number of game symbols 430. However, in the depicted embodiment, each reel strip 410A-410E may provide an ordered symbol set having a different fixed number of game symbols 430. The ordered symbol set of each reel strip 410A-410E may be predetermined, predefined, or randomly determined for one or more reel spins. Moreover, the gaming machine 200 may include multiple reel sets, wherein each reel set may comprise a different number of reel strips, carry different game symbols, specify a different order of game symbols, specify a different proportion of feature trigger symbols 320 to non-feature trigger symbols 328, etc. Furthermore, while the reel strips 410A-410E are depicted as a linear set of symbols, the game machine 200 utilizes the reel strips 410A-410E in a circular manner such that the first reel stop (e.g., reel stop 0 of reel strip 410A) is adjacent to the last reel stop (e.g., reel stop 16 of reel strip 410A).

Thus, the gaming machine 200 may generate a base game outcome 332 by assigning a reel strip to each reel of the base game and using the RNG 212 to randomly select a reel stop position for each assigned reel strip. The gaming machine 200 may then cause the display device 240 to spin base game symbols through the respective base game display position(s) 334 per the order specified by the assigned reel strip and stop the spinning of such base game symbols at the randomly selected reel stop position. Similarly, the gaming machine 200 may generate a feature game outcome 372 by assigning a reel strip to each reel of the feature game and using the RNG 212 to randomly select a reel stop position for each assigned reel strip. The gaming machine 200 may then cause the display device 240 to spin feature game symbols through the respective feature game display position(s) 374 per the order specified by the assigned reel strip and stop the spinning of such feature game symbols at the randomly selected reel stop position.

In some embodiments, sets of symbols and/or reel strips are stored in memory 208. Such symbols may include at least one feature trigger symbol 320 and a plurality of non-feature trigger symbols 328. In some embodiments, the feature trigger symbol 320 is implemented as a configurable symbol and the non-feature trigger symbols are implemented as non-configurable symbols. Per a configurable symbol implementation, the feature trigger symbol 320 includes a common component 322 and a variable component 324. See, e.g., FIG. 3A. The variable component 324 may identify an award associated with the feature trigger symbol 320. For example, the variable component 324 may be a numeric value that specifies an award amount for the feature trigger symbol 320. For other instances, the variable component 324 may be a textual label that specifies a particular jackpot, progressive jackpot, or other award, such as an award amount. In some embodiments, a reel strip may include one or more instances of the feature trigger symbol 320 in which the variable component 324 is fixed for that particular instance of the feature trigger symbol 320. In some embodiments, a reel strip may include one or more instances of the feature trigger symbol 320 in which the variable component 324 is not-fixed for that particular instance of the feature trigger symbol 320. In such embodiments, the processor 204 may randomly select the variable component 324 for each instance of the feature trigger symbol 320 before or after selecting a reel stop position for the reel strip.

Values for the variable components 324 may be determined using various different techniques. For example, multiple sets of reel strips may be stored in memory 208 and the values for the variable components 324 of one or more of such sets may be predefined. The processor 204 may then select a set of reel strips from the multiple sets of stored reel strips based on various criteria such as, for example, an amount bet, the selected denomination (1¢, 5¢, 10¢, etc.) of the game, whether a max bet was placed, a number of active paylines, a randomly generated number, etc. In some embodiments, one or more tables may be stored in the memory 208. The processor 208 may use one or more of such tables to generate the values for the variable components 324. Similar to the reel sets above, the processor 204 may select a table from the stored tables based on various criteria such as, for example, an amount bet, the selected denomination (1¢, 5¢, 10¢, etc.) of the game, whether a max bet was placed, a number of active paylines, a randomly generated number, etc. The selected table may provide a weighted table of multiplier values. In such an embodiment, the processor 204 may randomly select multiplier values from the table in a weighted manner (i.e., some multiplier values are more likely to be selected than others) and generate values for variable components 324 by multiplying a denomination value or a wager amount by the selected multiplier values. In other embodiments, the selected table may provide a weighted table of values. In such embodiments, the processor 204 may randomly select values from the table in a weighted manner (i.e., some values are more likely to be selected than others) and use the values selected from the table for the values of the variable components 324. Other techniques for generating or predefining the values of the variable components 324 are possible.

Examples of the feature trigger symbol 320 implemented as a configurable symbol are shown in FIGS. 3A-3E. As shown, the feature trigger symbol 320 includes a common component 322 depicted as a dollar symbol and a variable component 324 depicted as indicia overlaying the common component 322. However, in some embodiments, the feature trigger symbol 320 may be implemented as a non-configurable symbol (e.g., without a common component 322 and a variable component 324). In the depicted embodiments of FIGS. 3A-3E, the indicia of the variable components 324 are numeric values directly indicative of a value or number of credits associated with the particular instance of the feature trigger symbol 320. In other embodiments, the indicia may indirectly indicate the value or number of credits of a prize associated with the particular instance of the feature trigger symbol 320. For example, the indicia may include textual labels such as “grand,” “major,” “maxi,” “minor,” or “mini” to indicate prizes whose values respectively correspond to current values for grand, major, maxi, minor, and mini progressive jackpot prizes.

The indicia of the variable component 324 may also take other forms. For example, a car icon or car textual label may indicate that the player has the opportunity to win or car or has won a car. In some embodiments, such indicia may indicate only a portion of a prize. Continuing with the car example, the car icon may be split into four portions, each portion being assigned to a different feature trigger symbol 320. In such embodiments, a game outcome must include all four portions of the car icon in order to win the car prize.

In one embodiment, numeric values of the variable components 324 may be generated by randomly selecting one of a plurality of predefined multipliers for each variable component 324 and applying the selected multiplier to an amount wagered on the base game to obtain the numeric value for the respective variable component 324. In such an embodiment, the multipliers may be randomly selected according to a weighted probability based at least in part on the amount wagered on the base game. In an embodiment, the processor 204 may assign the variable components 324 after the configurable symbols have been selected for display but before the display device 240 displays the selected configurable symbols. In another embodiment, the processor 204 may assign values to the configurable symbols after the display device 240 displays the configurable symbols.

In some embodiments, a predefined value and/or a jackpot may be randomly selected for a variable components 324. As used herein, the term “jackpot”, as opposed to “prize”, refers to a progressive award which accumulates over multiple plays of the base game and/or the feature game. As will be appreciated, the jackpots may be funded from a variety of sources including funding from only plays of the gaming machine 200 itself, and/or funding from plays of a plurality of linked gaming machines 200. Furthermore, the jackpot may be triggered by any means known in the art such as by using a mystery trigger.

Figure 5:
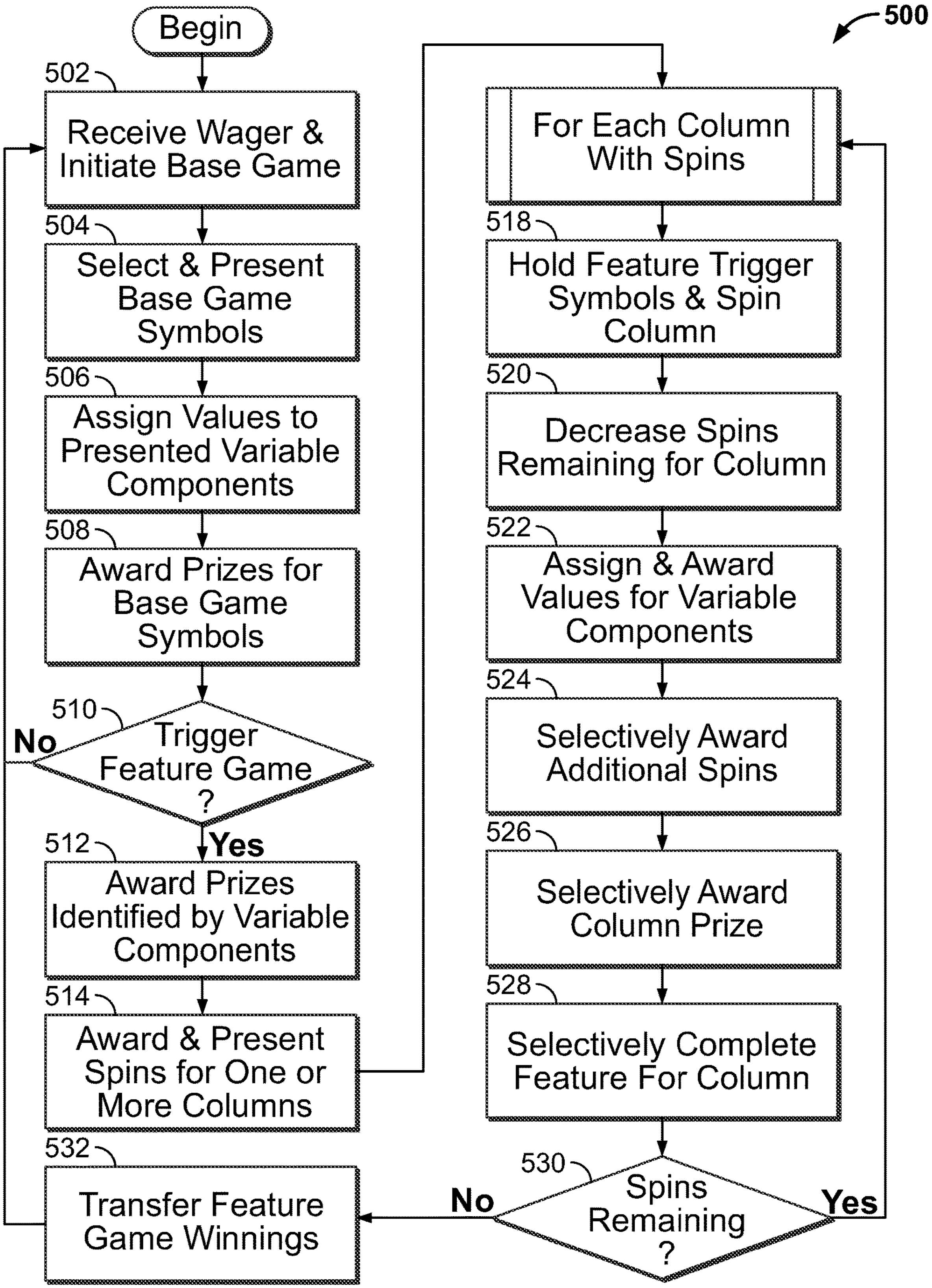
FIG. 5 depicts a flowchart for an exemplary method of playing a base game and feature game provided by a gaming machine.

Referring now to FIG. 5, details regarding a gaming machine and a game provided by such gaming machine are described. In particular, a flowchart is depicted in FIG. 5, which illustrates a general flow of the method 500 of playing a base game and feature game provided by a gaming machine. In the interest of clarity, the method 500 is described from the standpoint of gaming machine 200 of FIG. 2. However, it should be appreciated that the method 500 may be implemented in a similar manner by other gaming machines such as gaming machines 104A-104X of FIG. 1. In various embodiments, the method 500 is executed by a processor, such as processor 204.

At a high-level, the gaming machine 200 per the method 500 permits a player to play a base game and a feature game that may be triggered or initiated through play of the base game. During play of the base game, the gaming machine 200 may select symbols for a base game outcome 332 and display the symbols of the base game outcome 332. The gaming machine 200 may award prizes based on the symbols in the base game outcome 332. If a trigger condition occurs such as, for example, the base game outcome 332 including at least a threshold number of a feature trigger symbol 320, the gaming machine 200 triggers or initiates play of the feature game, awards each feature game column with a quantity of spins, and holds each feature trigger symbol of the base game outcome 332 at its respective feature game symbol display position 374. In various embodiments, if a trigger condition, such as the base game outcome including a threshold number of feature trigger symbols, does not occur, but a number of feature trigger symbols occur in the base game outcome that is less than the threshold number requirements to trigger the feature game, but greater than a second minimum threshold, then the gaming machine may cause an increase of one or more of the column prizes. For example, if the threshold number required to trigger the feature is 3, and the base game outcome includes 2 feature trigger symbols (which is greater than a second minimum threshold of one), then the column prizes associated with the 2 feature trigger symbols are incremented. The value of the increment may be predetermined for each column prize, randomly determined, determined based on the value displayed on the feature trigger symbols, etc. In certain embodiments, only certain predetermined or randomly determined column prizes may be incremented.

During play of the feature game, the gaming machine 200 holds each feature trigger symbol in its respective feature game symbol display position and, if a feature game column 380$_1$-380$_5$ has remaining spins, spins/respins reels of the respective column to obtain replacement symbols for each feature game symbol display position 374 without the feature trigger symbol 320. Each of the feature game columns 380$_1$-380$_5$ has a prize that is specifically associated to that feature game column. For each of the feature game columns 380$_1$-380$_5$, the gaming machine 200 may determine whether to award the prize for the respective feature column based on the symbols in the feature game column. Further details and alternative embodiments of the gaming machine 200, the base game, and/or the feature game are presented below.

Turning now to the flowchart of FIG. 5, the gaming machine 200 at 502 may receive input that specifies a wager on a base game. The gaming machine 200 may further receive input that initiates play of the base game. For example, a player via the player interface of the gaming machine 200 may specify a number of credits of an established credit balance to wager on play of the base game. Further, the player, via the player interface (e.g., pressing a button 236, pulling a handle, touching a touch screen, etc.), may initiate play of the base game.

At 504, the processor 204 of the gaming machine 200 may select base game symbols for a base game outcome 332 and cause the primary game display device 240 to display the base game symbols of the base game outcome 332 at respective base game symbol display positions 334. See, e.g., FIG. 3A. As explained above, the processor 204 may select the symbols of the base game outcome 332 by randomly selecting reel stop positions for each base game reel and its respective base game reel strip. The processor 204 at 506 may further assign values to variable components 324 of any displayed feature trigger symbols 320. As explained above, the processor 204 in some embodiments may assign values to variable components 324 prior to displaying the base game symbols at 504.

The processor 204 at 508 may determining whether the base game outcome 332 includes any winning symbol combinations along an activate payline. For each such winning symbol combination, the processor 204 may award a prize associated with the winning symbol combination. For example, the processor 204, in one embodiment, may provide an award of ten (10) credits for four “10” symbols aligned along payline 302. See, e.g., payline 302 of FIG. 3A.

At step 510, the processor 204 may determine whether a feature trigger event has occurred. In some embodiments, the processor 204 may determine that the trigger event has occurred if a base game outcome 332 includes at least a threshold number (e.g., four) of feature trigger symbols 320. Alternatively or additionally, the processor 204 may determine that the feature trigger event has occurred if a predetermined number (such as three or more) of base game columns $\mathbf{340_1}$-$\mathbf{340_5}$ or specific base game columns $\mathbf{340_1}$-$\mathbf{340_5}$ include at least one feature trigger symbol 320. For example, the processor 204 may determine that the feature trigger event has occurred if each of the three leftmost base game columns $\mathbf{340_1}$-$\mathbf{340_3}$ includes at least one feature trigger symbol 320. In some embodiments, the processor 204 may detect the occurrence of a feature trigger event based on other factors such a randomly generated number, amount of coin-in received since the last trigger, a progressive jackpot amount, etc.

If a feature trigger event has not occurred, the processor 204 may return to 502 to continue play of the base game. However, if a feature trigger event has occurred, the processor 204 may initiate the feature game.

In response to initiating the feature game, the processor 204 at 512 may award prizes identified by the variable components 324 of any feature trigger symbol 320. In one embodiment, the processor 204 adds such prizes to the feature game win meter 359. For example, the feature game win meter 359 of FIG. 3C has a value of 325, which is the sum of the numeric values 100, 75, 100, and 50 provided by the variable components 324 of the displayed feature trigger symbols 320.

In addition to awarding prizes of the feature trigger symbols 320, the processor 204 at 514 awards a quantity of spins to one or more feature game columns $\mathbf{380_1}$-$\mathbf{380_5}$. For example, the processor 204, in one embodiment, may independently award a quantity of spins to each feature game column $\mathbf{380_1}$-$\mathbf{380_5}$ that includes a feature trigger symbol 320. In other embodiments, the processor 204 may award a quantity of spins to all or a subset of the feature game columns $\mathbf{380_1}$-$\mathbf{380_5}$ regardless of whether the respective feature game column $\mathbf{380_1}$-$\mathbf{380_5}$ includes an instance of the feature trigger symbol 320. In some embodiments, the processor 204 may award feature game columns $\mathbf{380_1}$-$\mathbf{380_5}$ the same quantity of spins (e.g., three). In other embodiments, the processor 204 may independently award feature game columns $\mathbf{380_1}$-$\mathbf{380_5}$ with different quantities of spins. For example, the processor 204 may award the first feature game column $\mathbf{380_1}$ with five (5) spins, the second feature game column $\mathbf{380_2}$ with four (4) spins, the third feature game column $\mathbf{380_3}$ with three (3) spins, the fourth feature game column $\mathbf{380_4}$ with two (2) spins, and the fifth feature game column $\mathbf{380_5}$ with one (1) spin. In some embodiments, the quantity of feature spins awarded to feature game columns is based on the quantity of feature trigger symbols in each column. For example, if there is one feature trigger symbol in a column, then a first quantity of feature spins is awarded for that feature game column, and if there are two feature trigger symbols in a column, then a second quantity (preferably larger, but can be smaller) of feature spins is awarded for that feature column. Other combinations of spin award quantities are possible and contemplated.

At 514, the processor 204 may further cause the display device 240 to display spin indicia $\mathbf{396_1}$-$\mathbf{396_5}$ that identify the quantity of spins awarded and thus also identify the quantity of spins remaining for each feature game column $\mathbf{380_1}$-$\mathbf{380_5}$. For example, as shown in FIG. 3C, the processor 204 may update the spin indicia $\mathbf{396_1}$, $\mathbf{396_2}$, $\mathbf{396_3}$, $\mathbf{396_5}$ of feature game prize tabs $\mathbf{392_1}$, $\mathbf{392_2}$, $\mathbf{392_3}$, $\mathbf{392_5}$ to indicate that three (3) spins being awarded to the first feature game column $\mathbf{380_1}$, the second feature game column $\mathbf{380_2}$, the third feature game column $\mathbf{380_3}$, and the fifth feature game column $\mathbf{380_5}$. In particular, the processor 204 may award such spins due to each of feature game columns $\mathbf{380_1}$, $\mathbf{380_2}$, $\mathbf{380_3}$, $\mathbf{380_5}$ including an instance of the feature trigger symbol 320. Conversely, the processor 204 may cause the display device 240 to indicate that no spins were awarded to the fourth feature game column $\mathbf{380_4}$ since the fourth feature game column $\mathbf{380_4}$ lacks a feature trigger symbol 320. In one embodiment, the processor 204 causes the display device 240 to make such an indication by dimming, ghosting, or blanking game symbols presented in the fourth feature game column $\mathbf{380_4}$ as well as dimming, ghosting, or blanking the feature game prize tab 3924 associated with the fourth feature column $\mathbf{380_4}$.

For each feature game column $\mathbf{380_1}$-$\mathbf{380_5}$ with spins remaining, the processor 204 at 518 may hold any feature trigger symbols 320 in its respective feature game symbols display position 374 and select replacement symbols for each non-feature trigger symbol 328 in the respective column. The processor 204 may further cause the primary game display device 240 to display the replacement symbols at respective feature game symbol display positions 374. As shown, the processor 204 may cause the display device 240 to present any replacement symbols that are non-feature trigger symbols 328 as a dimmed, ghosted, or blank symbol in order to bring further attention to any replacement symbols that are feature trigger symbols 320.

As explained above, the processor 204 may select the replacement symbols of the feature game outcome 372 by randomly selecting reel stop positions for each feature game reel and its respective feature game reel strip. In one embodiment, the processor 204 selects the replacement symbols using feature game reel strips that include a full set of feature game symbols. In other embodiments, the feature game reel strips may include a reduced set of feature game symbols that take into account the already held feature trigger symbols 320. In an alternative embodiment, the feature game reel strips may provide an increased set of feature game symbols. For example, a feature trigger symbol 320 may be purchased or otherwise awarded to the feature game reel strips prior to initiating the feature game.

At 520, the processor 204 may decrease the quantity of spins for the feature game column $\mathbf{380_1}$-$\mathbf{380_5}$ and update the spin indicia $\mathbf{396_1}$-$\mathbf{396_5}$ to reflect the decreased quantity of spins remaining for the feature game column $\mathbf{380_1}$-$\mathbf{380_5}$. In one embodiment, the processor 204 may decrease the quantity of spins by a fixed decrement amount (e.g. 1). However, the processor 204 may decrease the quantity of spins remaining by any desired amount. For example, the decrement amount may be dependent upon a particular non-feature trigger symbol 328 selected as a replacement symbol for the respective feature game column $\mathbf{380_1}$-$\mathbf{380_5}$.

The processor 204 at 522 may assign values to variable components 324 of any replacement symbol that is feature trigger symbol 320. In some embodiments, the processor 204 may assign values to variable components 324 prior to displaying the replacement symbols. The processor 204 may further update the feature game win meter 359 based on the values assigned to the variable components 324.

The processor 204 at 524 may then determines for each feature game column $\mathbf{380_1}$-$\mathbf{380_5}$ whether to award additional spins. In one embodiment, the processor 204 awards additional spins to a feature game column $\mathbf{380_1}$-$\mathbf{380_5}$ in response to a replacement symbol for the respective column being a feature trigger symbol 320. However, in some embodiments, the processor 204 may elect to award additional spins to a feature game column $\mathbf{380_1}$-$\mathbf{380_5}$ based on other criteria such as, for example, a mystery trigger, a random trigger, a particular non-feature trigger symbol 328, etc.

If additional spins are awarded, then the processor 204 at 524 may increase the quantity of spins for each of the feature game columns $\mathbf{380_1}$-$\mathbf{380_5}$ and update the spin indicia $\mathbf{396_1}$-$\mathbf{396_5}$ to reflect the increased quantity of spins remaining for the feature game column $\mathbf{380_1}$-$\mathbf{380_5}$. In one embodiment, the processor 204 may increase the quantity of spins by a fixed increment amount (e.g. 1). In some embodiments, the processor 204 may increase the quantity of spins by resetting the quantity of spins to its initially award value. For example, if a feature game column $\mathbf{380_1}$-$\mathbf{380_5}$ was initially awarded three (3) spins, the processor 204 may reset the quantity of spins of remaining spins to three (3). In some embodiments, the processor 204 may not increase the quantity of spins, regardless of whether additional feature trigger symbols 320 is shown in any of the feature game columns $\mathbf{380_1}$-$\mathbf{380_5}$.

At 526, the processor 204 determines for each feature game column $\mathbf{380_1}$-$\mathbf{380_5}$ whether to award any column prizes. In one embodiment, the processor 204 may determine that a column prize is to be awarded when its respective feature game column $\mathbf{380_1}$-$\mathbf{380_5}$ includes at least a threshold number of the feature trigger symbol 320. For example, the processor 204 may determine to award the column prize when its feature game column $\mathbf{380_1}$-$\mathbf{380_5}$ includes a number of feature trigger symbols 320 equal to the number of feature game symbol display positions 374 in the feature game column $\mathbf{380_1}$-$\mathbf{380_5}$. In other embodiments, the threshold number may be less than the number of feature game symbol display positions 374. For example, the processor 204 may determine to award a column prize when at least three (3) of four (4) symbol display positions 374 in a feature game column $\mathbf{380_1}$-$\mathbf{380_5}$ includes instances of the feature trigger symbol 320. In addition, the processor 204 may determine to award a column prize based on the non-feature trigger symbols 328 selected as replacement symbols. For example, the processor 204 may determine to award a column prize in response to a particular non-feature trigger symbol being selected for its respective feature game column $\mathbf{380_1}$-$\mathbf{380_5}$.

For any awarded column prizes, the processor 204 at 526 may update feature game win meter 359. In particular, the processor 204 may add a credit value of any awarded column prizes to a currently depicted credit value for the feature game win meter 359. The processor 204 further sets the remaining spins to zero (0) for any feature game column $\mathbf{380_1}$-$\mathbf{380_5}$ that resulted in an award of its column prize.

At 528, the processor 204 determines, based on the quantity of spins for each feature game column $\mathbf{380_1}$-$\mathbf{380_5}$, whether a feature game column $\mathbf{380_1}$-$\mathbf{380_5}$ has no remaining spins. If a column has no remaining spins, the processor 204 at 528 may determine that the feature game is over or completed for that particular feature game column $\mathbf{380_1}$-$\mathbf{380_5}$ and may reflect such status to player. For example, the processor 204 in one embodiment causes the display device 240 to present a spin indicia $\mathbf{396_1}$-$\mathbf{396_5}$ of "completed" for each feature game column $\mathbf{380_1}$-$\mathbf{380_5}$ that has no remaining spins.

If any feature game column $\mathbf{380_1}$-$\mathbf{380_5}$ has spins remaining at 530, the processor 204 may return to 518 in order to further spin reels of the respective feature game column $\mathbf{380_1}$-$\mathbf{380_5}$. On the other hand, once all feature game columns $\mathbf{380_1}$-$\mathbf{380_5}$ have no spins remaining, the feature game ends. In response to the feature game ending, the processor 204 may transfer credits of the feature game win meter 359 and the base game win meter 356 to the credit balance meter 352. After updating the meters, the processor 204 may return to 502 after any prizes are paid at step 532.

Referring now to FIGS. 3A-3G, an example play through of the base game and the feature game are described. FIG. 3A shows an example base game screen 300 with a base game outcome 332 that includes both feature trigger symbols 320 and non-feature trigger symbols 328. The base game screen 300 further depicts current prize values $\mathbf{314_1}$-$\mathbf{314_5}$ and base game prize tabs $\mathbf{342_1}$-$\mathbf{342_5}$ that identifies column prize values for each base game column $\mathbf{340_1}$-$\mathbf{340_5}$. As further shown, the base game outcome 300 includes a winning combination of four (4) "10" symbols along payline 302 as well as four (4) feature trigger symbols 320. In the embodiment depicted, three (3) feature trigger symbols 320 is sufficient to trigger the feature game.

Figure 3B:
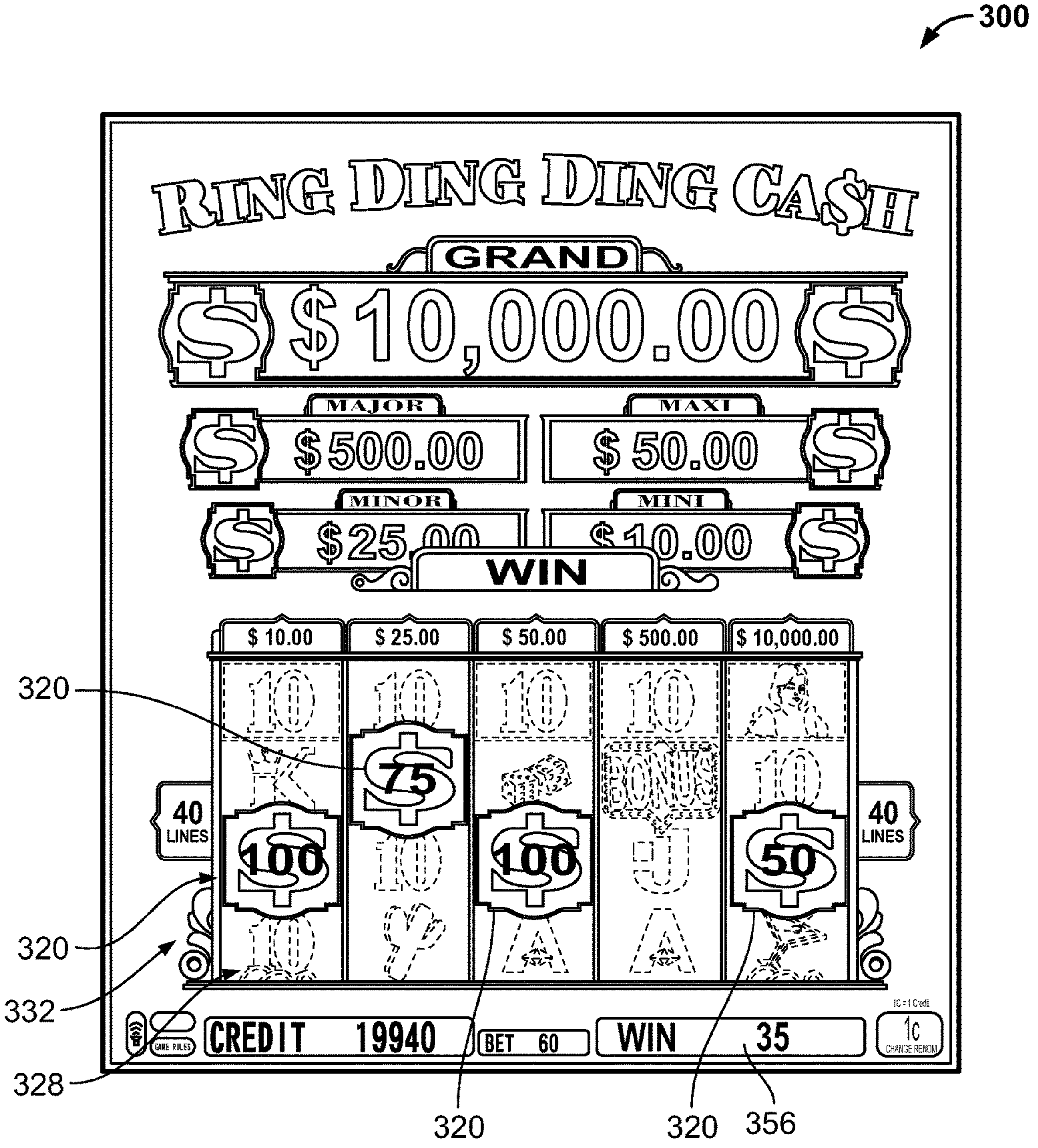
Figure 3C:
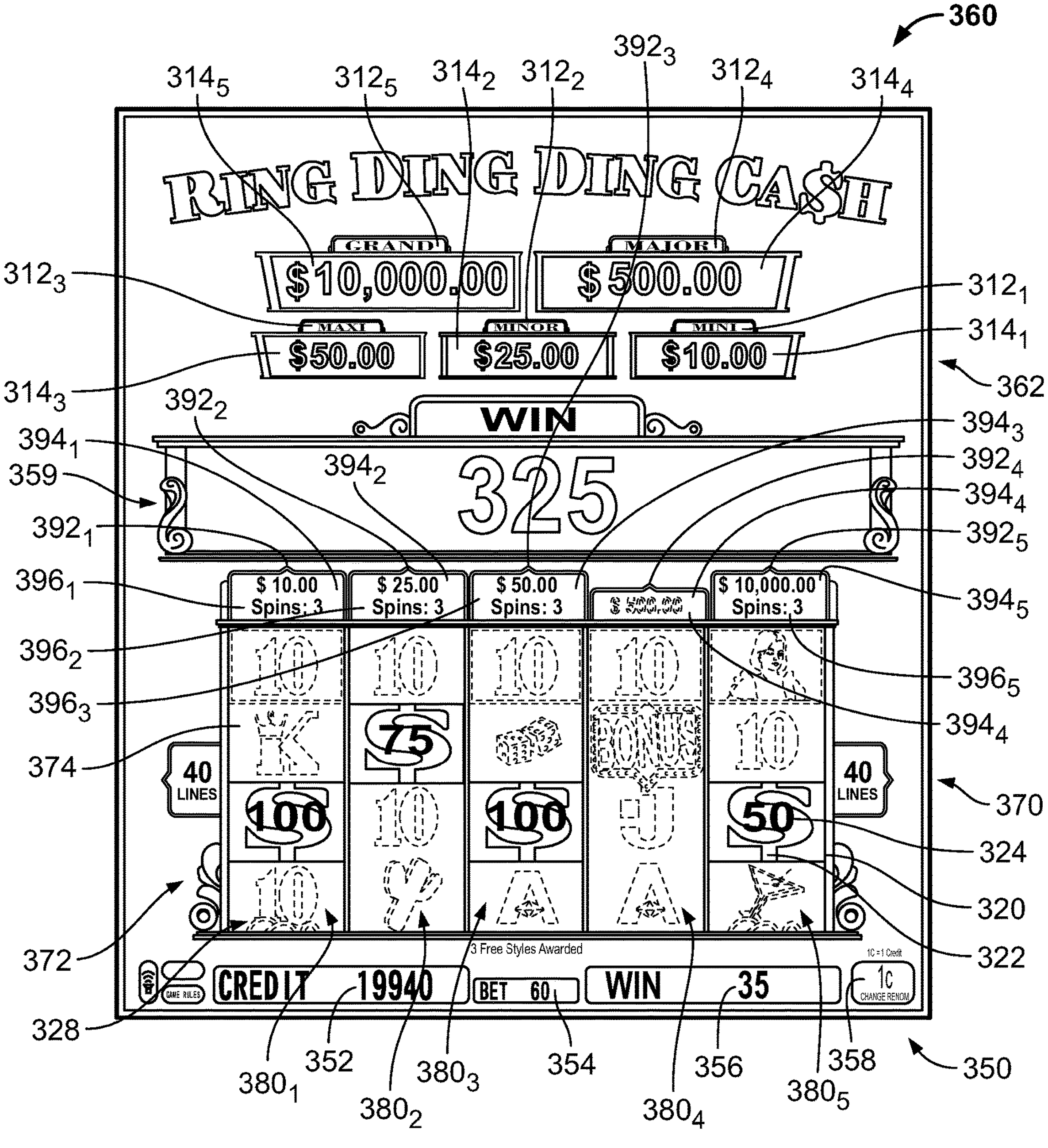

FIG. 3B depicts triggering of the feature game as a result of the base game outcome of FIG. 3A. As shown, the non-feature trigger symbols 328 have been dimmed or ghosted thus further highlighting the feature trigger symbols 320. The base game win meter 356 further shows that 35 credits were awarded due to winning combinations of non-feature trigger symbols 328 in the base game outcome 332 such as, for example, the four (4) "10" symbols along payline 302.

The feature game screen 360 of FIG. 3C depicts an initial state of the feature game resulting from the base game outcome of FIG. 3A. In particular, base game prize tabs $\mathbf{342_1}$, $\mathbf{342_2}$, $\mathbf{342_3}$, $\mathbf{342_5}$ of FIG. 3A have transitioned into feature game prize tabs $\mathbf{392_1}$, $\mathbf{392_2}$, $\mathbf{392_3}$, $\mathbf{392_5}$ to show that each of feature game columns $\mathbf{380_1}$, $\mathbf{380_2}$, $\mathbf{380_3}$, $\mathbf{380_5}$ has been awarded three (3) spins due to the presence of a feature trigger symbol in each of such columns. Moreover, the feature game prize tab 3924 is dimmed or ghosted to show that the fourth feature game column 3084 was not awarded spins and therefore will not be part of the current feature game. The feature game win meter 359 further depicts 325 credits, which is the sum of the variable components 324 of the four feature trigger symbols 320.

Figure 3D:
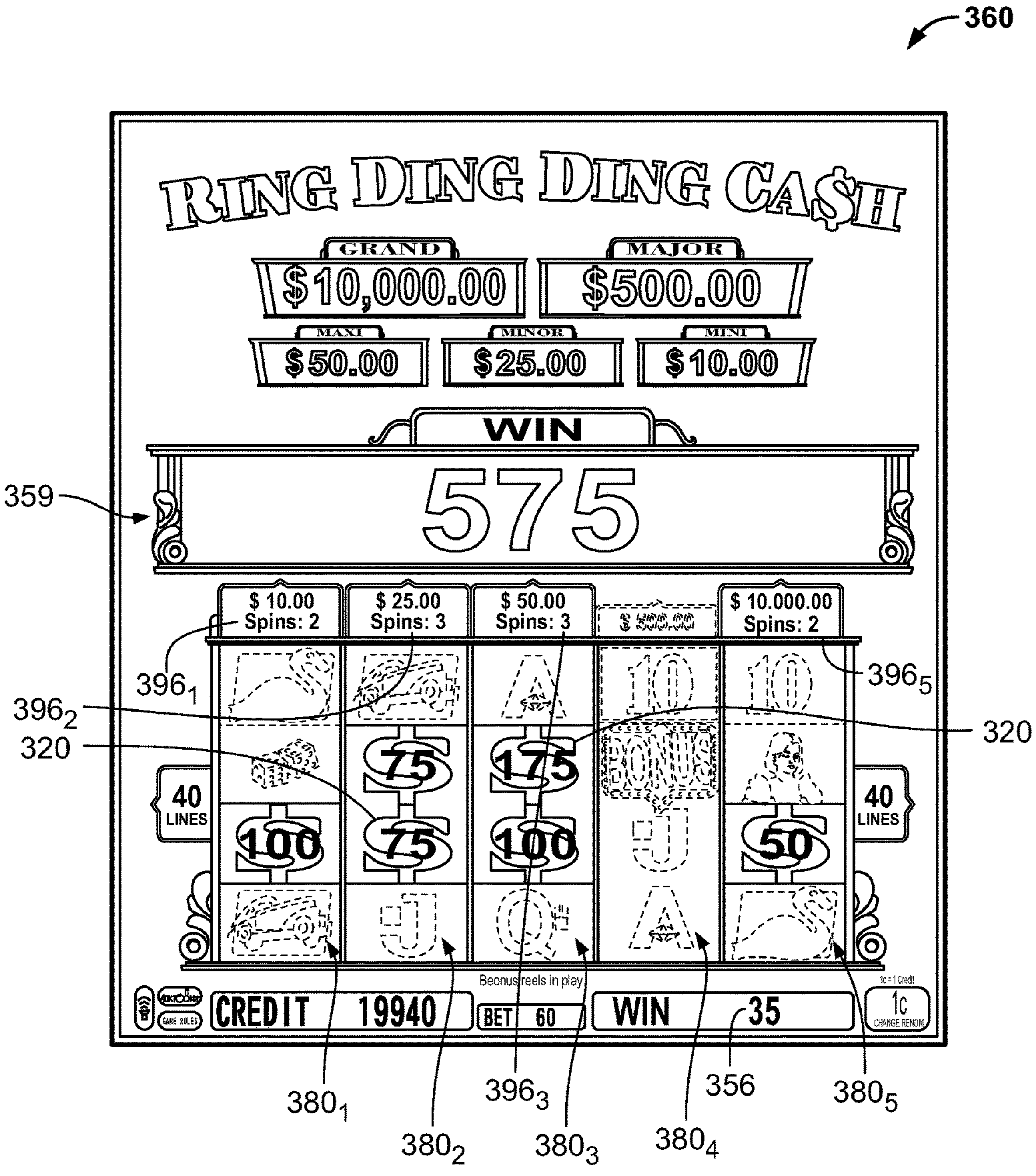

FIG. 3D depicts the feature game screen 360 after each of feature game columns $\mathbf{380_1}$, $\mathbf{380_2}$, $\mathbf{380_3}$, $\mathbf{380_5}$ received replacement symbols as a result of a single spin of such columns. Of note, the spin indicia $\mathbf{396_1}$, $\mathbf{396_5}$ for the first feature game column $\mathbf{380_1}$ and the fifth feature game column $\mathbf{380_5}$ have been decreased by one (1) to two (2) spins to reflect that one of the initially award three (3) spins has been used for those columns. Conversely, the spin indicia $\mathbf{396_2}$, $\mathbf{396_3}$ for the second feature game column $\mathbf{380_2}$ and the third feature game column $\mathbf{380_3}$ remain at three (3) spins. Like the feature game columns $\mathbf{380_1}$, $\mathbf{380_5}$, the spins awarded to feature game columns $\mathbf{380_2}$, $\mathbf{380_3}$ were decreased by one (1) to two (2) spins to reflect that one of the initially award three (3) spins has been used for those columns, but were subsequently reset to their initial awarded spins of three (3) due to each feature game column $\mathbf{380_2}$, $\mathbf{380_3}$ receiving at least one feature trigger symbol 320 as a replacement symbol. The feature game win meter 359 has been increased to 575 credits to reflect the credit values of the newly presented feature trigger symbols 320 in feature game columns $\mathbf{380_2}$, $\mathbf{380_3}$.

Figure 3E:
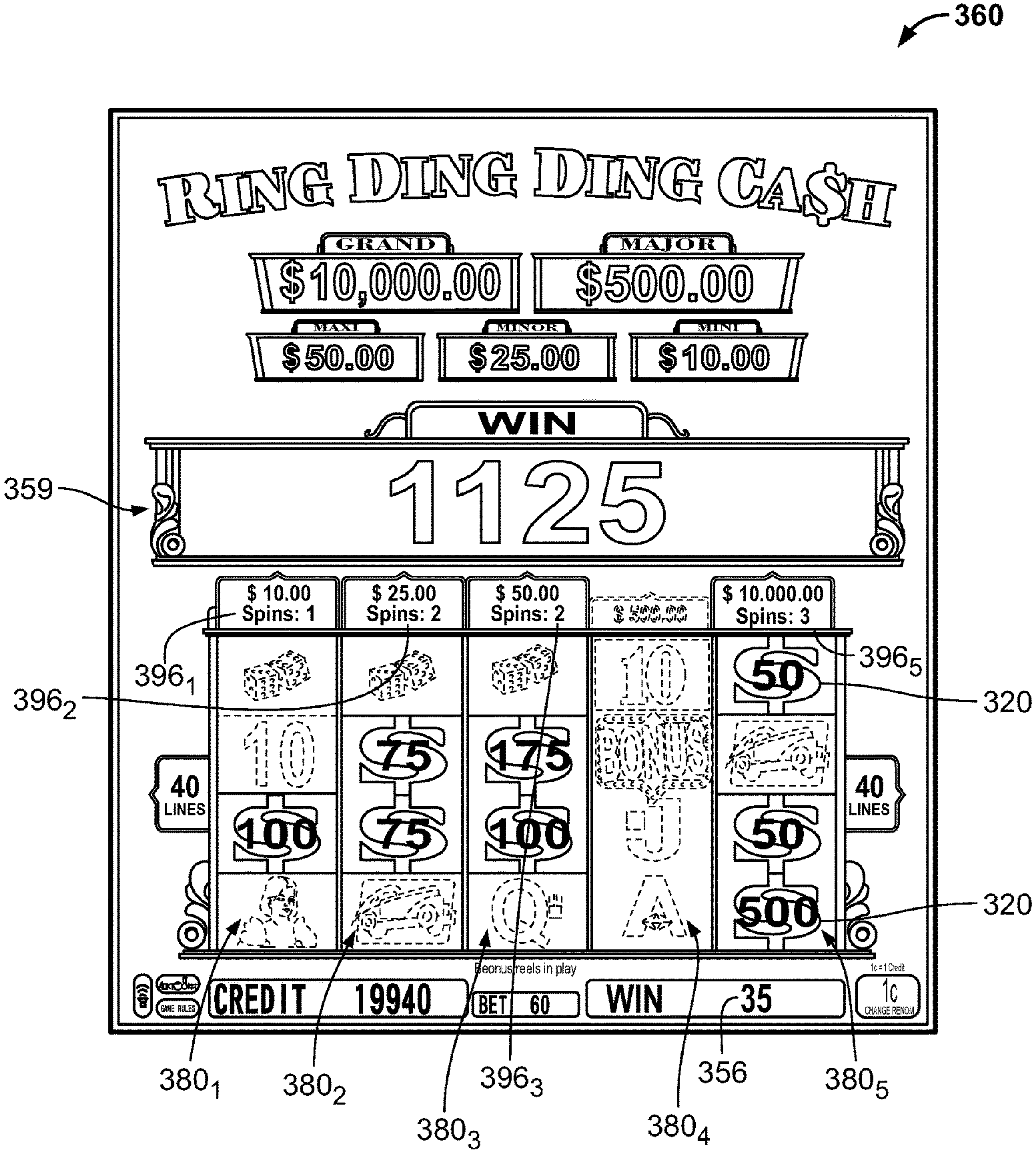

FIG. 3E depicts the feature game screen 360 after another spin of each of feature game columns $\mathbf{380_1}$, $\mathbf{380_2}$, $\mathbf{380_3}$, $\mathbf{380_5}$. Of note, the spin indicia $\mathbf{396_1}$-$\mathbf{396_3}$ for feature game columns $\mathbf{380_1}$-$\mathbf{380_3}$ have been decreased by one (1) to reflect that another spin has been used for those columns. Conversely, the spin indicia $\mathbf{396_5}$ for the fifth feature game column $\mathbf{380_5}$ has been reset to its initial awarded spins of three (3) due to receiving at least one feature trigger symbol 320 as a replacement symbol. The feature game win meter 359 has been increased to 1125 credits to reflect the credit values of the newly presented feature trigger symbols 320 in the first feature game column $380_5$.

Figure 3F:
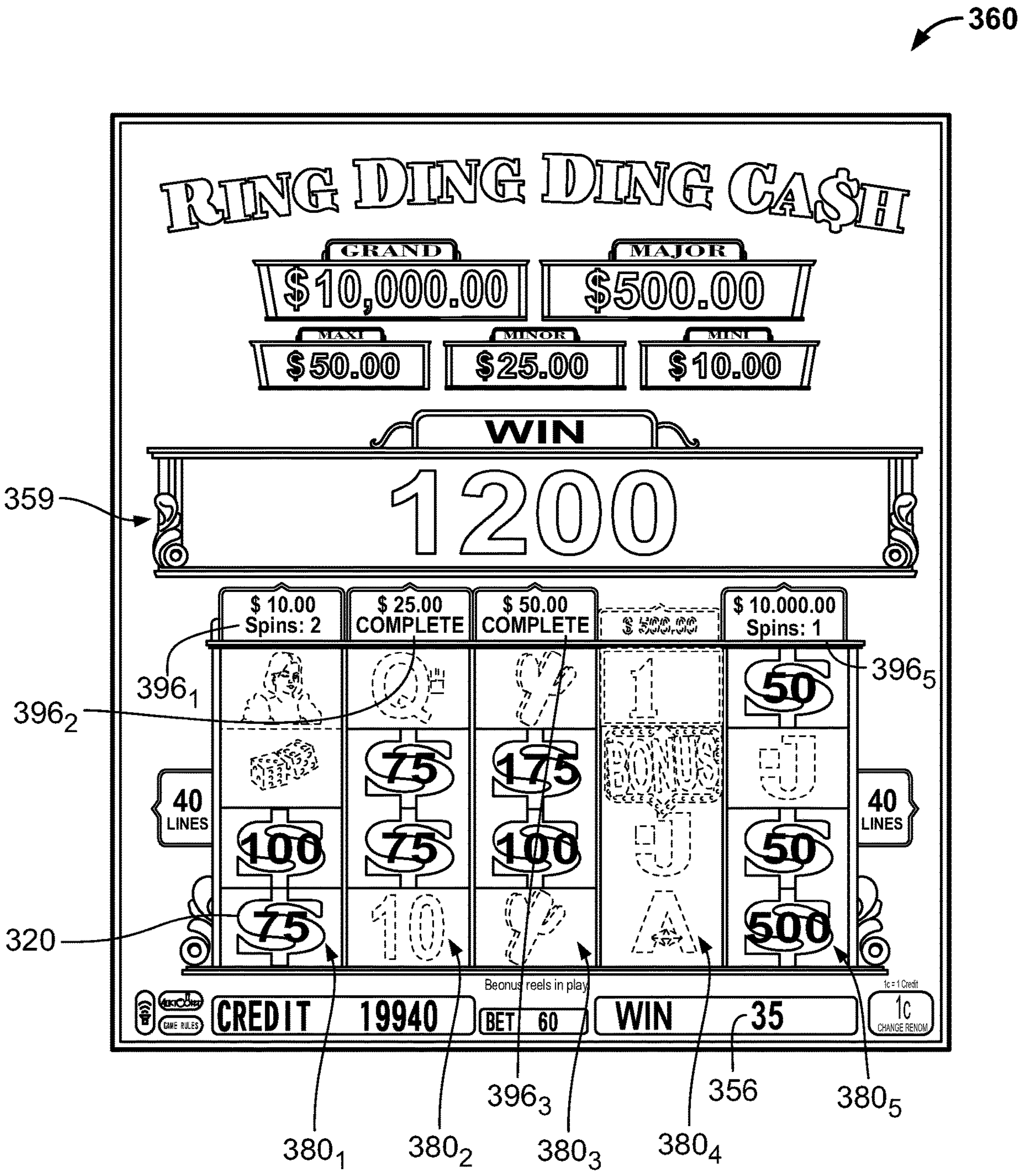

FIG. 3F depicts the feature game screen 360 after two more spins of each feature game column $380_1$, $380_2$, $380_3$, $380_5$. Of note, the spin indicia $396_2$, $396_3$ for the second feature game column $380_2$ and the third feature game column $380_3$ indicate that the feature game is complete for those columns. Namely, feature game columns $380_2$, $380_3$ failed to receive an additional feature trigger symbol 320 during those two additional spins. As a result, the second feature game column $380_2$ and the third feature game column 3083 have used all of their awarded spins. Similarly, the fifth feature game column $380_5$ failed to receive a feature trigger symbol during those two additional spins. But, as shown by the feature game prize tab $392_5$, the fifth feature game column $380_5$ still has one remaining spin. Conversely, the first feature game column $380_1$ received a feature trigger symbol 320 as a result of the first of the two additional spins. As a result, its quantity of spins was reset to three (3) spins, prior to the second spin of the two additional spins. Accordingly, the first feature game column $380_1$ still has two remaining spins as reflected by the first spin indicia $396_1$. The feature game win meter 359 has 1200 credits, which is the sum of all of the variable components 324 of the feature trigger symbols 320 in feature game columns $380_1$-$380_5$.

Figure 3G:
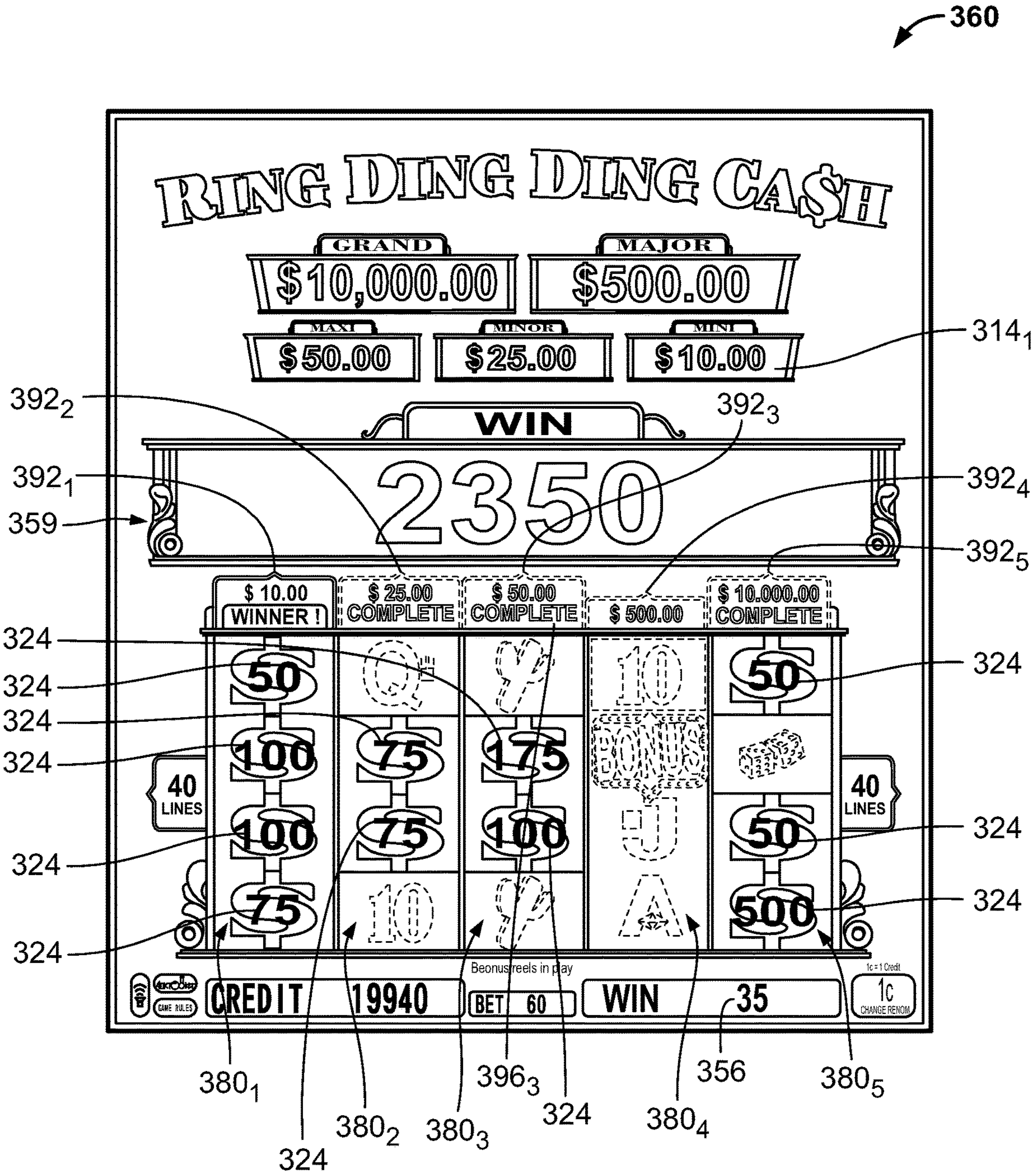

Finally, FIG. 3G depicts the feature game screen 360 after two successful spins of the first feature game column $380_1$ and a single unsuccessful spin of the fifth feature game column $380_5$. The single unsuccessful spin of the fifth feature game column $380_5$ used the last spin awarded to the column. As a result, the feature game prize tab $392_5$ indicates the fifth feature game column $380_5$ has completed the feature game. As further shown, the feature game prize tabs $392_2$, $392_3$, $392_5$ of the completed feature game columns $380_2$, $380_3$, $380_5$ may be dimmed or ghosted to bring further attention to the columns that are still active. The two successful spins of the first feature game column $380_1$ results in there being four (4) feature trigger symbols 320 in the first feature game column $380_1$. In one embodiment, the processor 204 awards the associated column prize in response to four (4) feature trigger symbols 320 in the respective column. As shown, the first feature game prize tab $392_1$ indicates a winner of the associated column prize, which is the mini prize value $314_1$ of $10.00. As shown by the monetary denomination indicator 358, the game denomination is 10. Thus, the $10.00 mini prize value corresponds to 1000 credits. The feature game win meter 359 is shown with 2350 credits, which is the sum of the award mini prize value $314_1$ (1000 credits) and all the credit values depicted by the variable components 324 of the feature trigger symbols 320 displayed in feature game columns $380_1$-$380_5$.

In various embodiments, the (a) quantity of feature trigger symbols per symbol column required to trigger the feature game, (b) quantity of feature trigger symbols in a symbol column required to award the column prize, (c) numeric value of the variable component 324, (d) prize value of the one or more prize indicia may be (i) predetermined, (ii) randomly determined, and/or (iii) based at least in part on one or more of the following (1) wager amount, (2) amount of money wagered over a player session, and/or (3) a player's player account status, etc.

Although the flowchart of FIG. 5 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrency. Further, in some embodiments, one or more of the blocks shown in FIG. 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A gaming device, comprising:
- a display device comprising columns of symbol display positions;
- a memory device storing instructions; and
- a controller in communication with a gaming server, wherein execution of the instructions causes the controller to at least:
  - receive a game outcome from the gaming server;
  - present symbols of the received game outcome in the columns of symbol display positions;
  - spin one or more first column reels to update one or more first symbols presented in a first column of the columns of symbol display positions;
  - present first information for the first column in a first column status area associated with the first column; and
  - present a first output in response to the first column achieving a first winning symbol combination within a first quantity of spins allocated to the first column.

2. The gaming device of claim 1, wherein execution of the instructions causes the controller to:
- spin one or more second column reels to update one or more second symbols presented in a second column of the columns of symbol display positions; and
- present a second output in response to the second column achieving a second winning symbol combination within a second quantity of spins allocated to the second column.

3. The gaming device of claim 1, wherein execution of the instructions causes the controller to determine that the first column achieved the first winning symbol combination if the first column includes at least a threshold number of instances of a predetermined symbol.

4. The gaming device of claim 1, wherein execution of the instructions causes the controller to:
- decrease a remaining quantity of spins for the first column in response to spinning the one or more first column reels; and
- increase the remaining quantity of spins for the first column in response to the first column including at least one instance of a predetermined symbol.

5. The gaming device of claim 1, wherein execution of the instructions causes the controller to display a first prize associated with the first column in the first column status area.

6. The gaming device of claim 2, wherein execution of the instructions causes the controller to display the first column status area and a second column status area such that the first column status area and the second column status area are respectively aligned with the first column and the second column of the columns of symbol display positions.

7. The gaming device of claim 6, wherein execution of the instructions causes the controller to:

display a first prize associated with the first column in the first column status area; and display a second prize associated with the second column in the second column status area.

8. The gaming device of claim 6, wherein execution of the instructions causes the controller to:

display a remaining quantity of spins for the first column in the first column status area; and display a remaining quantity of spins for the second column in the second column status area.

9. A method of a gaming device, the method comprising:

presenting, via a display of the gaming device, a game outcome in columns of symbol display positions of the gaming device;

presenting first information for a first column of the columns of symbol display positions in a first column status area associated with the first column;

presenting, in a second column status area associated with a second column of the columns of symbol display positions, second information for the second column;

holding, via a controller of the gaming device, symbols of a first symbol type in a first column of the columns of symbol display positions;

spinning, via the controller, one or more of first column reels to update each symbol display position of the first column presenting a symbol not of the first symbol type with a replacement symbol; and presenting, via the display, a first column result in response to the first column comprising at least a first predetermined number of symbols of the first symbol type.

10. The method of claim 9; wherein:

presenting the first information in the first column status area comprises presenting, a first quantity of spins allocated to the first column; and presenting the second information in the second column status area comprises presenting, a second quantity of spins allocated to the second column.

11. The method of claim 10, comprising:

presenting aspects of the first column status area and the first column in a first color; and presenting aspects of the second column status area and the second column in a second color that is different than the first color.

12. The method of claim 9, wherein presenting the first column result comprises presenting a first column prize award in response to spins allocated to the first column achieving at least the first predetermined number of symbols of the first symbol type.

13. The method of claim 12, comprising:

allocating a quantity of spins to the first column;

decreasing the quantity of spins remaining for the first column in response to the spinning of the one or more first column reels failing to obtain at least one replacement symbol of the first symbol type; and increasing the quantity of spins remaining for the first column in response to the spinning of the one or more first column reels obtaining at least one replacement symbol of the first symbol type.

14. One or more non-transitory computer-readable storage media comprising instructions, which when executed, cause a gaming server to:

present, via a gaming device, symbols of a game outcome in columns of symbol display positions;

present first information for a first column of the columns of symbol display positions in a first graphical element associated with the first column;

present second information for a second column of the columns of symbol display positions in a second graphical element associated with the second column;

cause one or more first symbols presented by the gaming device to be updated in the first column of the columns of symbol display positions; and present, via the gaming device, a first column result in response to the first column achieving a first winning symbol combination.

15. The one or more non-transitory computer-readable storage media of claim 14, wherein the instructions, when executed, cause the gaming server to at least one of present the symbols, cause the one or more first symbols to be updated, or present the first column result by transmitting one or more messages to the gaming device.

16. The one or more non-transitory computer-readable storage media of claim 14, wherein:

the gaming device comprises one of a smart phone, a tablet, a laptop, or a game console; and the instructions, when executed, cause the gaming server to present the game outcome via the one of the smart phone, the tablet, the laptop, or the game console.

17. The one or more non-transitory computer-readable storage media of claim 16, wherein the instructions, when executed, cause the gaming server to:

allocate an initial quantity of updates to the first column; and present, via the gaming device, the first column result in response to one or more updates of the first column achieving the first winning symbol combination.

18. The one or more non-transitory computer-readable storage media of claim 16, wherein the instructions, when executed, cause the gaming server to present, via the gaming device, a quantity of updates remaining for the first column in the first graphical element associated with the first column.

19. The one or more non-transitory computer-readable storage media of claim 16, wherein the instructions, when executed, cause the gaming server to present, via the gaming device, a quantity of updates remaining for a second column of the columns of symbol display positions in the second graphical element associated with the second column.

20. The one or more non-transitory computer-readable storage media of claim 16, wherein the instructions, when executed, cause the gaming server to:

present, via the gaming device, a first prize for the first column in the first graphical element associated with the first column; and present, via the gaming device, a second prize for the second column in the second graphical element associated with the second column.

* * * * *